(12) United States Patent
Winniczek et al.

(10) Patent No.: US 11,303,868 B1
(45) Date of Patent: *Apr. 12, 2022

(54) IMAGE QUALITY DETECTION AND CORRECTION SYSTEM

(71) Applicant: CAPTUREPROOF, Inc., San Francisco, CA (US)

(72) Inventors: Jaroslaw Walery Winniczek, Daly City, CA (US); David Chocron, Mill Valley, CA (US); Meghan Patricia Conroy, San Francisco, CA (US)

(73) Assignee: CAPTUREPROOF, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,893

(22) Filed: Feb. 16, 2021

Related U.S. Application Data

(63) Continuation of application No. 16/455,420, filed on Jun. 27, 2019, now Pat. No. 11,050,984.

(60) Provisional application No. 62/690,872, filed on Jun. 27, 2018.

(51) Int. Cl.
| | |
|---|---|
| *H04N 9/64* | (2006.01) |
| *G06T 5/00* | (2006.01) |
| *G06T 5/40* | (2006.01) |
| *H04N 5/232* | (2006.01) |
| *H04N 9/73* | (2006.01) |

(52) U.S. Cl.
CPC ............. *H04N 9/646* (2013.01); *G06T 5/003* (2013.01); *G06T 5/40* (2013.01); *H04N 5/232123* (2018.08); *H04N 9/73* (2013.01)

(58) Field of Classification Search
CPC ......................... H04N 5/232123; H04N 9/646
See application file for complete search history.

(56) References Cited

U.S. PATENT DOCUMENTS

| | | | |
|---|---|---|---|
| 8,752,441 B2 | 6/2014 | Asaoka | |
| 8,988,686 B2 | 3/2015 | Hillebrand et al. | |
| 11,050,984 B1* | 6/2021 | Winniczek | ............. G06T 5/003 |
| 2017/0272741 A1 | 9/2017 | Maltz et al. | |

\* cited by examiner

*Primary Examiner* — Christopher K Peterson
(74) *Attorney, Agent, or Firm* — Robert Crownover

(57) ABSTRACT

A method and instructions for operating an image quality system can comprise: obtaining an original image; sensing a subsequent image with an image-capturing device, comprising: testing a focus of the subsequent image with the image-capturing device implementing a blur test, informing a user to retake the subsequent image based on the subsequent image failing the blur test, evaluating a histogram for the subsequent image, informing the user to retake the subsequent image based on the histogram including a value exceeding a saturation threshold, and informing the user to retake the subsequent image based on the histogram including the value exceeding an underexposure threshold; compressing the histogram with an adjustment curve; and color matching the subsequent image to the original image.

20 Claims, 34 Drawing Sheets
(27 of 34 Drawing Sheet(s) Filed in Color)

120

124

124

124

1600

128

138C

3302

4702

124

IMAGE QUALITY DETECTION AND CORRECTION SYSTEM

CROSS-REFERENCE TO RELATED APPLICATION(S)

This is a continuation of U.S. patent application Ser. No. 16/455,420 filed Jun. 27, 2019, which claims the benefit of priority to U.S. Provisional Patent Application No. 62/690,872 filed Jun. 27, 2018 and claims priority benefit to all common subject matter. The content of these applications, in their entirety, are incorporated herein by reference.

TECHNICAL FIELD

This disclosure relates to imaging technologies, more particularly to imaging technologies for detecting and correcting image quality.

BACKGROUND

In recent times, imaging technology has advanced with a tremendous pace. The rapidly growing portable electronics market, e.g. cellular phones, tablet computers, and PDAs, are an integral facet of modern life and has made imaging technologies ubiquitous and readily available.

In one example, external visual imaging techniques have long been an integral part of diagnosing and treating patient ailments. Some medical arts such as plastic surgery rely almost exclusively on visual end points and imaging.

Together with the development and supply of imaging technology, a need to utilize this low cost readily available imaging technology for analysis, diagnostics, and comparison purposes has arisen. Many fields have discovered a need for clear, accurate, consistently arranged, and time variant images. These fields cover wide implementation areas including construction management, insurance, and medicine.

Illustratively, scars and their healing are often characterized through a doctor's visual analysis of the patient's skin. A doctor monitoring the healing of a scar is primarily concerned with the size, shape, and visibility of the scar at a given time as well as how the size, shape, color, and visibility of the scar are changing over time. Being able to review close up images, in greater detail, of the subject or relevant area are of equal importance.

Further, in the cosmetics industry, research scientists must visually study how make-up, creams (e.g. wrinkle and cellulite treatments), and other products affect the appearance of subjects over a course of treatment.

Yet further, pharmaceutical researchers involved in clinical trials must visually study experimental topical therapeutics to determine the efficacy of such therapeutics on patients suffering from various skin ailments. The results of such visual studies are then used to support regulatory filings with the goal of having such therapeutics approved for sale to consumers.

Since external visual imaging in the medical arts is concerned with the appearance and presentation of how certain structures on the human body are visually changing over time, both still and motion photography are vital tools for image acquisition, storage and analysis. There is a clear need to produce clear and consistent photographs with consistent exposure, saturation, focus, and color. However, the use of still and motion photography in the medical arts presents a unique set of challenges.

A primary challenge inherent in the use of still and motion photography is this inability to capture consistent images due to different unique lighting environments and image backgrounds. While a still or motion image may provide information, often the ability to truly see change and make diagnoses may require the ability to more closely view an image in greater detail. When patients take images, later sent or shared with their practitioner or any other healthcare professional, they may lack the ability to ensure color, focus, saturation, and exposure consistency, which can be crucial in delivering effective diagnoses.

Previous techniques and systems for capturing consistent images requires a high level of training, skill, and work in order to interface with the technology, manipulate images, and analyze regions of the images more closely. These prior techniques and systems for capturing consistent images are therefore expensive and time consuming to use.

Solutions have been long sought but prior developments have not taught or suggested any complete solutions, and solutions to these problems have long eluded those skilled in the art. Thus, there remains a considerable need for systems and methods that can provide consistent exposure, saturation, focus, and color for images and image analysis.

SUMMARY

An image quality system and methods, providing consistent exposure, saturation, focus, and color for images and image analysis, are disclosed. A method and instructions for operating an image quality system can comprise: obtaining an original image; sensing a subsequent image with an image-capturing device, comprising: testing a focus of the subsequent image with the image-capturing device implementing a blur test, informing a user to retake the subsequent image based on the subsequent image failing the blur test, evaluating a histogram for the subsequent image, informing the user to retake the subsequent image based on the histogram including a value exceeding a saturation threshold, and informing the user to retake the subsequent image based on the histogram including the value exceeding an underexposure threshold; compressing the histogram with an adjustment curve; and color matching the subsequent image to the original image.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The image quality system is illustrated in the figures of the accompanying drawings which are meant to be exemplary and not limiting, in which like reference numerals are intended to refer to like components, and in which.

DETAILED DESCRIPTION

Figure 1:
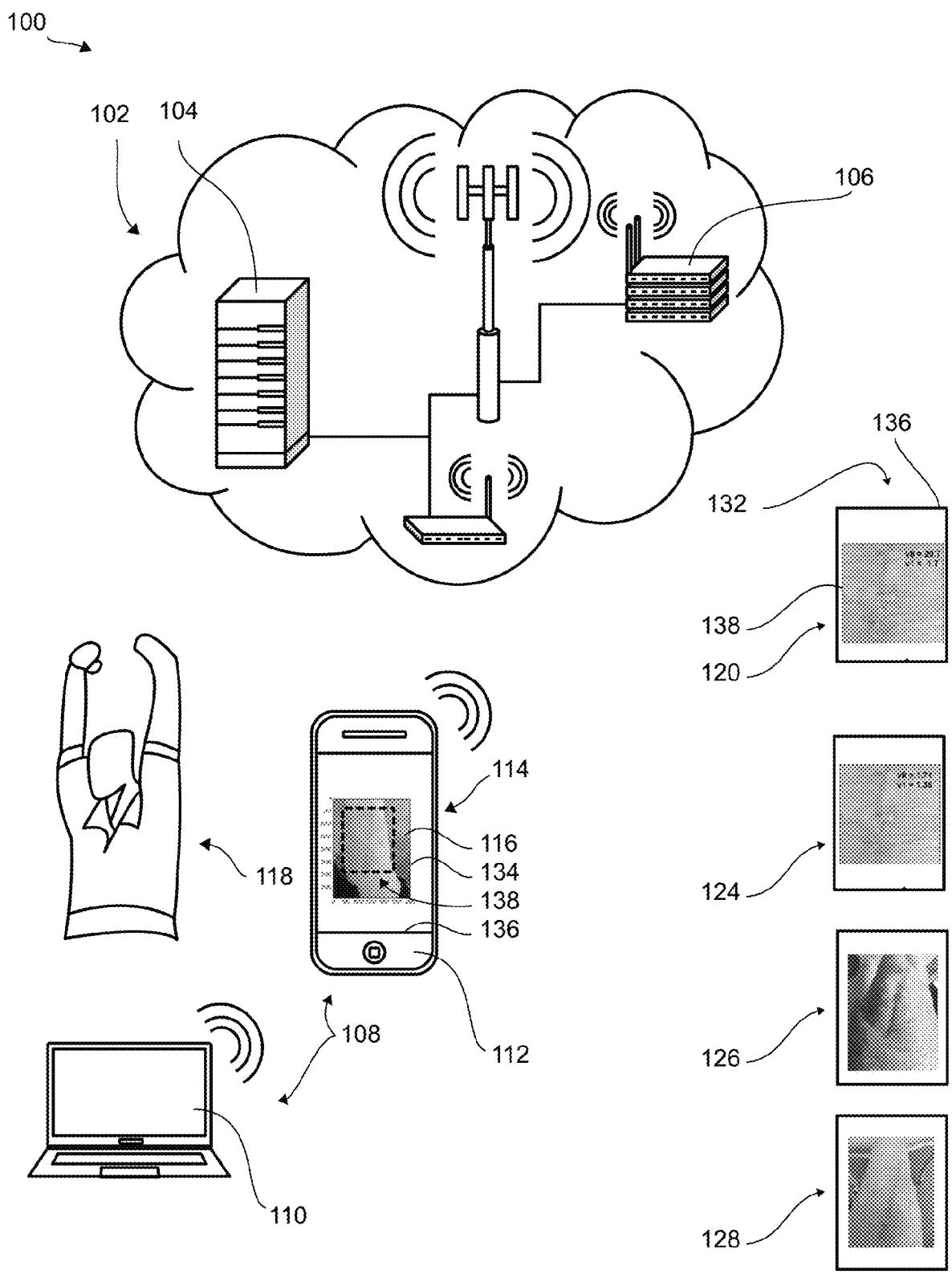
FIG. 1 is a block diagram of the image quality system.

In the following description, reference is made to the accompanying drawings that form a part hereof, and in which are shown by way of illustration, embodiments in which the image quality system may be practiced. It is to be understood that other embodiments may be utilized and structural changes may be made without departing from the scope of the image quality system.

When features, aspects, or embodiments of the image quality system are described in terms of steps of a process, an operation, a control flow, or a flow chart, it is to be understood that the steps can be combined, performed in a different order, deleted, or include additional steps without departing from the image quality system as described herein.

The image quality system is described in sufficient detail to enable those skilled in the art to make and use the image quality system and provide numerous specific details to give a thorough understanding of the image quality system; however, it will be apparent that the image quality system may be practiced without these specific details.

In order to avoid obscuring the image quality system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

Referring now to FIG. 1, therein is shown a block diagram of the image quality system 100. The image quality system 100 can include elements of a distributed computing system 102 including servers 104, routers 106, and other telecommunications infrastructure.

The distributed computing system 102 can include the Internet, a wide area network (WAN), a metropolitan area network (MAN), a local area network (LAN), a telephone network, cellular data network (e.g., 3G, 4G, 5G) and/or a combination of these and other networks (wired, wireless, public, private or otherwise).

The servers 104 can function both to process and store data for use on user devices 108 including laptops 110, cellular phones 112, tablet computers, and cameras, for example. It is contemplated that the servers 104 and the user devices 108 can individually comprise a central processing unit, memory, storage and input/output units and other constituent components configured to execute applications including software suitable for displaying user interfaces, the interfaces optionally being generated by a remote server, interfacing with the cloud network, and managing or performing capture, transmission, storage, analysis, display, or other processing of data and or images.

The servers 104 and the user devices 108 of the image quality system 100 can further include a web browser operative for, by way of example, retrieving web pages or other markup language streams, presenting those pages or streams, executing scripts, controls and other code on those pages or streams, accepting user input with respect to those pages or streams, and issuing HTTP requests with respect to those pages or streams. The web pages or other markup language can be in HAML, CSS, HTML, Ruby on Rails or other conventional forms, including embedded XML, scripts, controls, and so forth as adapted in accord with the teachings hereof. The user devices 108 and the servers 104 can be used individually or in combination to store and process information from the image quality system 100 in the form of operation method steps such as detecting steps, calculating steps, and displaying steps.

The image-capturing devices 114 can be used to capture and display original images 116 of a subject 118. It is contemplated that the subject 118 can be people, objects, pictorial representations such as photographs or drawings, and models.

The user devices 108 can also be image-capturing devices 114, such as the cellular phone 112, the camera, the laptop 110, or the tablet computer. It is contemplated that the image-capturing device 114 can be any device suitable for acquiring images and communicating the images to the distributed computing system 102.

In addition to the original image 116, which will be discussed below with respect to FIGS. 2 and 8-12, the image-capturing device 114 can also sense subsequent images 120. The subsequent images 120 can be adjusted to form an adjusted image 124, which is depicted and is discussed below with regard to at least FIGS. 3-5 and 7, a problem image 126 which is depicted and is discussed below with regard to at least FIGS. 15, 16, and 19-24, and a good image 128 is depicted and is discussed below with regard to at least FIGS. 17, 18, 25, and 26.

It is contemplated that the original image 116, the subsequent image 120, the adjusted image 124, the problem image 126, and the good image 128 of the subject 118 can be included into an image history 132. The image histories 132 can be uniquely generated for an individual body part 134 of the subject 118. The body part 134 can be contained within an image frame 136.

The image frame 136 can include the body part 134 of the subject 118 entirely within the image frame 136. A region of interest 138 can be defined on the body part 134 of the subject 118 within the image frame 136.

As will be appreciated by those having ordinary skill in the art, for proper analysis, a sequence of images must include images comparable to each other. That is, the focus should be adequate, the exposure should be correct, the shutter speed should be fast enough, the color should be similar, the lighting should be identical, the shadows should be minimized, and the pose of the body should be identical for all images and between all images contained within the image history 132 for a particular body part 134.

To this end, the image quality system 100 is disclosed including quality tests for focus, saturation, and underexposure. Specifically focus metrics can be used to ensure appropriate focus between images within the image history 132.

Focus can be tested for the subsequent image 120 and other images within the image history 132. The focus can be tested after the subsequent image 120 is captured or can be tested on the image-capturing device 114 itself.

It has been discovered that testing the images on the image-capturing device 114 itself can be highly beneficial for ensuring proper focus. If focus is not within an appropriate range, the user can be asked to re-capture the image with the image-capturing device 114 in order to ensure a more appropriate focus.

Exposure metrics, along with exposure corrections, can be used to ensure appropriate exposure between images within the image history 132 and simultaneously addresses the problem of excessive shadowing. It has been discovered that some exposure errors can be tested and corrected while other exposure errors can only be reported and a request to re-capture the image be made.

Correctable exposure errors can include images having high contrast or harsh shadows. Images with these traits can be corrected by reducing the contrast and shadowing.

Figure 2:
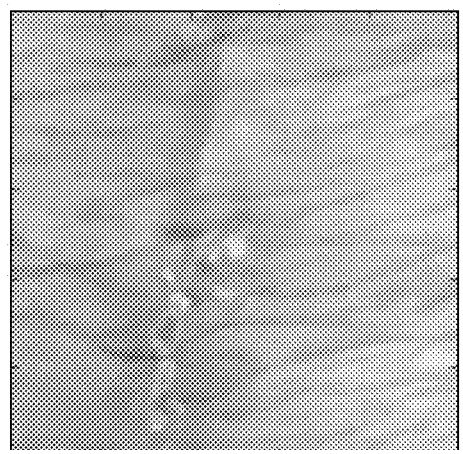
FIG. 2 is the subsequent image of FIG. 1 for the region of interest of FIG. 1.
Figure 3:
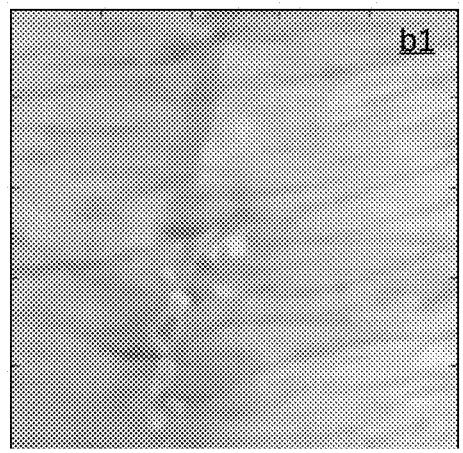
FIG. 3 is the adjusted image of FIG. 1 such as a first blurred image or a b1 image.
Figure 4:
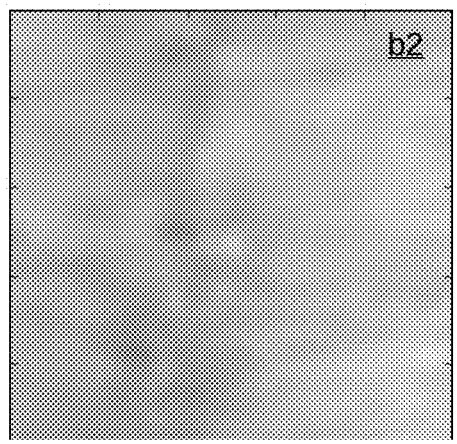
FIG. 4 is the adjusted image of FIG. 1 such as a second blurred image or a b2 image.
Figure 5:
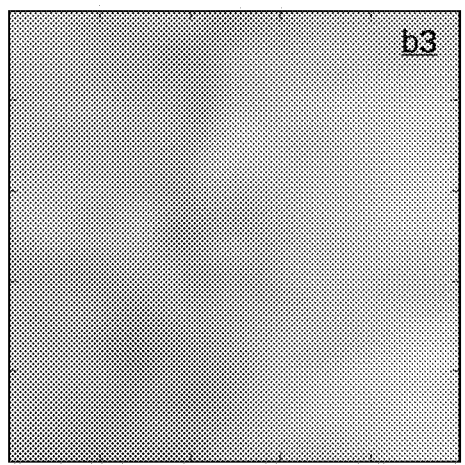
FIG. 5 is the adjusted image of FIG. 1 such as a third blurred image or a b3 image.

Referring now to FIGS. 2-5, therein are depicted images of the image history 132 of FIG. 1 for the region of interest 138 of FIG. 1. Illustratively, FIG. 2 is the subsequent image 120 of FIG. 1 for the region of interest 138 of FIG. 1. FIG. 3 is the adjusted image 124 of FIG. 1 such as a first blurred image b1. FIG. 4 is the adjusted image 124 of FIG. 1 such as a second blurred image b2. FIG. 5 is the adjusted image 124 of FIG. 1 such as a third blurred image b3.

The adjusted images 124 can each be the subsequent images 120 with a different extent of blurring applied. That is, a blur test can be implemented by the image-capturing device 114 to test the focus of the subsequent image 120. For example, the adjusted image 124 of FIG. 3 can be the subsequent image 120 with a Gaussian blur of 11×11.

As a further example, the adjusted image 124 of FIG. 4 can be the subsequent image 120 with a Gaussian blur of 51×51. As a further example, the adjusted image 124 of FIG. 5 can be the subsequent image 120 with a Gaussian blur of 91×91.

Figure 7:
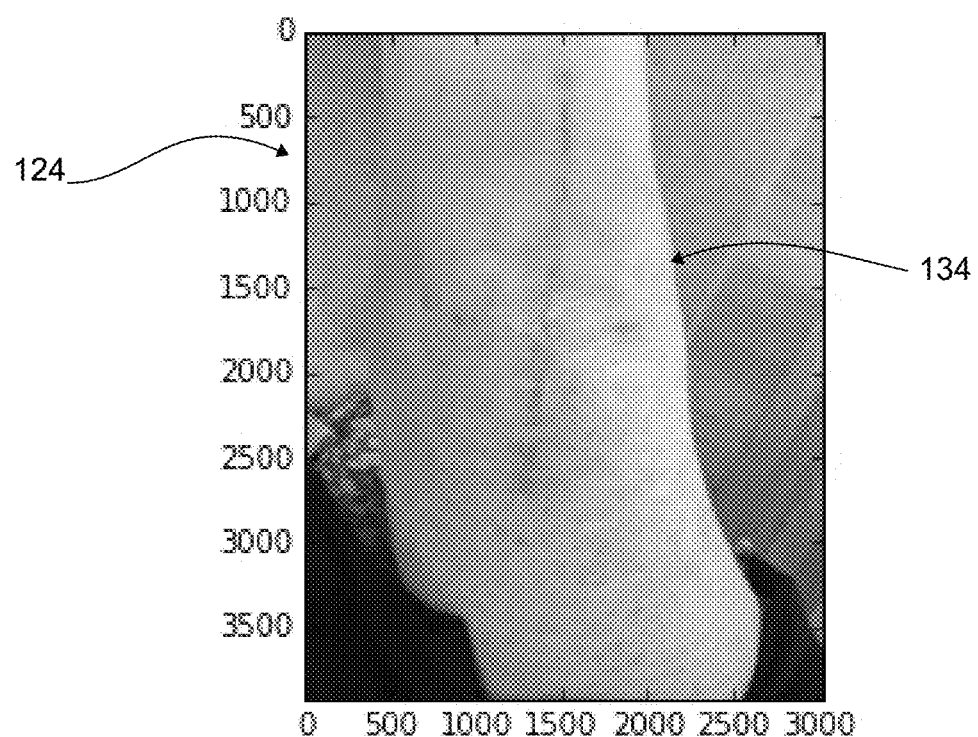
FIG. 7 is the adjusted image of FIG. 6.

The subsequent image 120, along with the adjusted images 124 of FIGS. 3-5, can be a small cropped region of interest 138 for the subsequent image 120 or can be a full sized image such as the adjusted image 124 of FIG. 7. Illustratively, the subsequent image 120, along with the adjusted images 124 of FIGS. 3-5 could be the region of interest 138.

In order to test for focus the subsequent image 120 can be converted to gray. Next, the variance of intensity can be measured for the subsequent image 120. The variance of intensity can be V0 for the subsequent image 120 of FIG. 2 and the adjusted images 124 of FIGS. 3-5.

The subsequent image 120 of FIG. 2 can then be blurred, for example, by applying the Gaussian blur 11×11 to generate the adjusted image 124 of FIG. 3, the Gaussian blur 51×51 to generate the adjusted image 124 of FIG. 4, or the Gaussian blur 91×91 to generate the adjusted image 124 of FIG. 5. The images of FIGS. 2-5 can be magnified regions of and contained within the subsequent image 120.

A variance of the subsequent image 120 can be measured. The variance can be a Laplacian transform of the subsequent image 120 that has been converted to grey. The variance of the subsequent image 120 can be V0.

The subsequent image 120 can then be blurred, for example by applying the Gaussian blur 11×11 to generate the adjusted image 124 or the blurred image b1. The variance can be measured before the blur as V0 and after the blur as V1.

Similarly, the variance can be measured before the blur as V0 for the subsequent image 120 and can be measured as V1 after applying the Gaussian blur 51×51. Further, the variance can be measured before the blur as V0 for the subsequent image 120 and can be measured as V1 after applying the Gaussian blur 91×91.

Once the subsequent image 120 is blurred, the variance of intensity for the adjusted image 124 is measured to provide a V1. V0 of the subsequent image 120 can be compared to V1 for each of the adjusted images 124. If there is a large change between V0 and V1 the subsequent image 120 is in reasonable focus, otherwise the image should be discarded and re-captured.

It is contemplated that the image quality system 100 can implement a variance threshold for determining whether the distance between V0 and V1 is too small and thus out of focus. The variance threshold could for example be a parameter set within the image-capturing device 114, such as 10 or 60. Images falling below the variance threshold would be considered out of focus and the user would be informed to retake the subsequent image 120 based on the subsequent image 120 failing the blur test.

Informing the user could be accomplished through audio, visual, or haptic means. This can include voice or text commands, vibrations, the use of symbols such as arrows and horizon planes, or a combination thereof.

It has been discovered that comparing the variance between V0 and V1 can render barely perceptible blur is easily detected. It should be noted that the slight blurring of the subsequent image 120 changes the V0 for the adjusted images 124 of FIGS. 3-5.

FIG. 3, for example, can be a blurred version of the subsequent image 120. It can be noted that the blur is visible between V0 and V1 in FIG. 3, which is illustrated by the distance between V0 and V1 of FIG. 3 being small.

Figure 6:
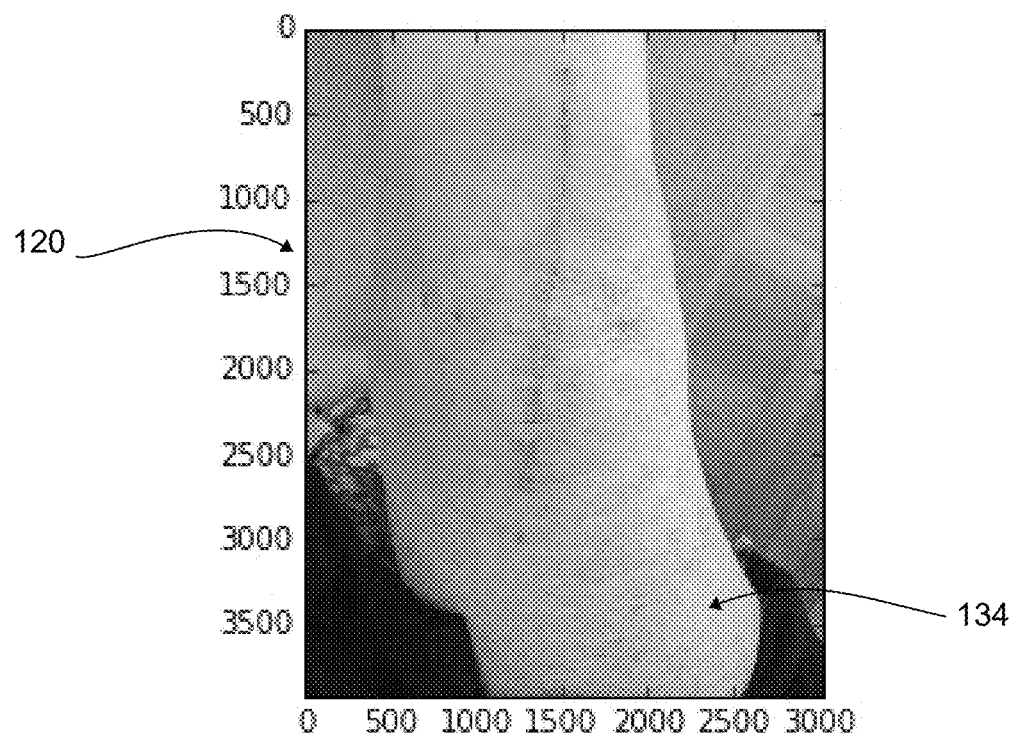
FIG. 6 is the body part of the subject in the subsequent image of FIG. 1.

Referring now to FIGS. 6 and 7, FIG. 6 depicts the body part 134 of the subject 118 of FIG. 1 in the subsequent image 120. FIG. 7 depicts the adjusted image 124 or the blurred image b2, which corresponds to the adjusted image 124 of FIG. 4 having the 51×51 Gaussian blur applied. As will be appreciated by those of ordinary skill in the art, a significant blur is barely detectable.

Figure 8:
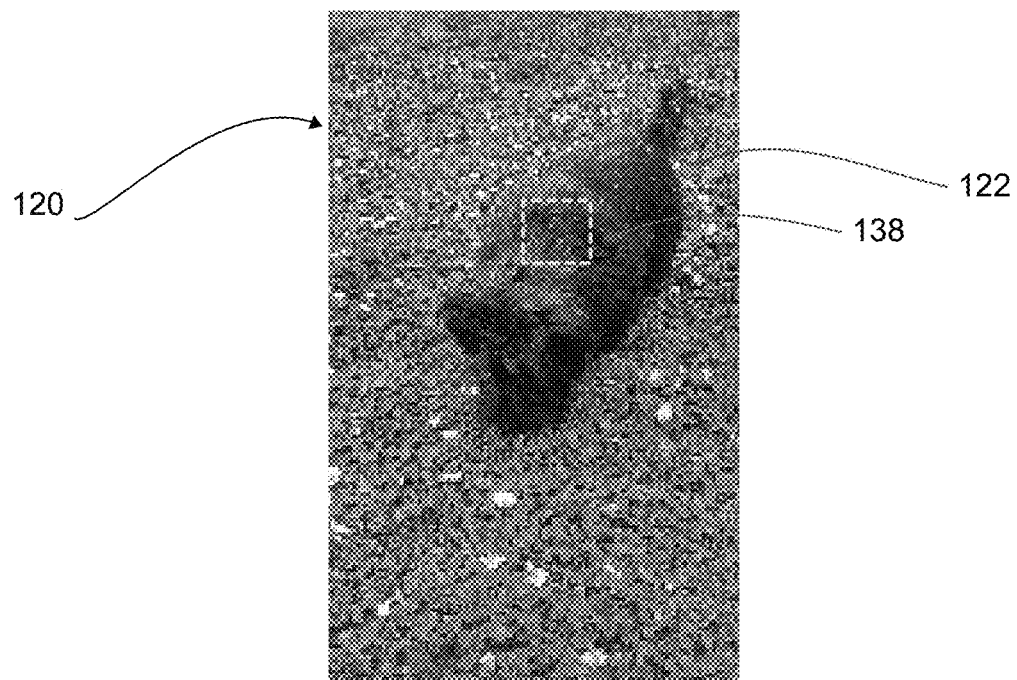
FIG. 8 is the subject in the subsequent image of FIG. 1.
Figure 9:
FIG. 9 is the magnified region of interest of FIG. 8.

Referring now to FIGS. 8 and 9, FIG. 8 depicts the subject 118 in the subsequent image 120, while FIG. 9 is a magnified image of the region of interest 138 of FIG. 8. The subject 118 can be a dog against a well focused background, while the region of interest 138 can be a portion of the subject 118.

As illustrated by FIG. 8, the entire image can be analyzed to determine the V0 and then blurred and remeasured to produce V1 for the whole of the subsequent image 120. As illustrated by FIG. 9, the magnified region of interest 138 can be analyzed to determine V0 and then blurred and measured to produce V1 for the whole of the region of interest 138.

As will be appreciated, V0 can be 980.7 and V1 can be 8.8 for the subsequent image 120 of FIG. 8. As will further be appreciated, V0 can be 978.6 and the V1 can be 5.3 for the magnified region of interest 138 of FIG. 9. It has been discovered that the reason that the V0 and the V1 are similar between the subsequent image 120 of FIG. 8 and the magnified region of interest 138 of FIG. 9 is that the subsequent image 120 is in overall good focus, and because there is a lot of detail in the subsequent image 120 including dog hair, grass, flowers, and other details.

Figure 10:
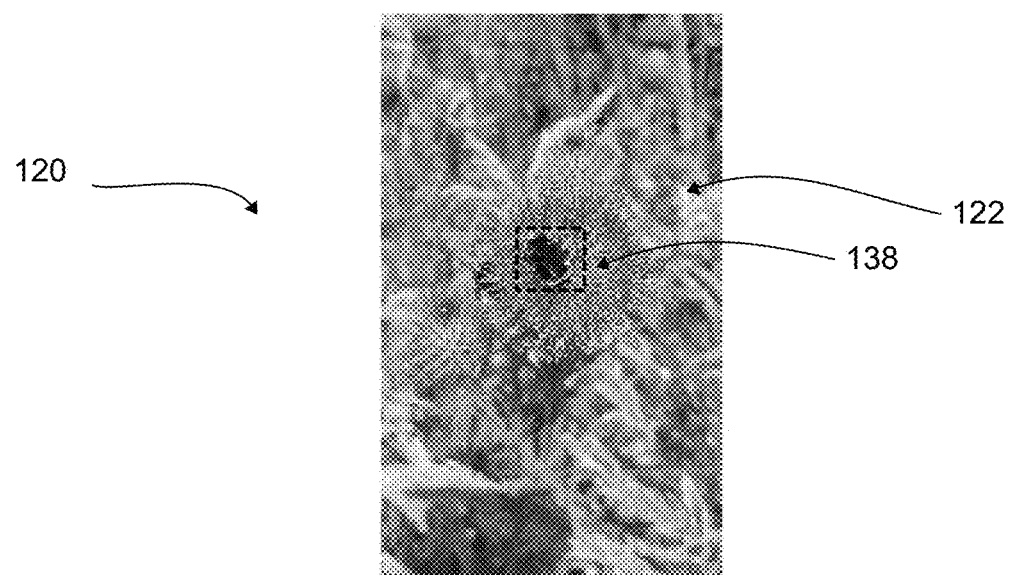
FIG. 10 is the subject in the subsequent image of FIG. 1.
Figure 11:
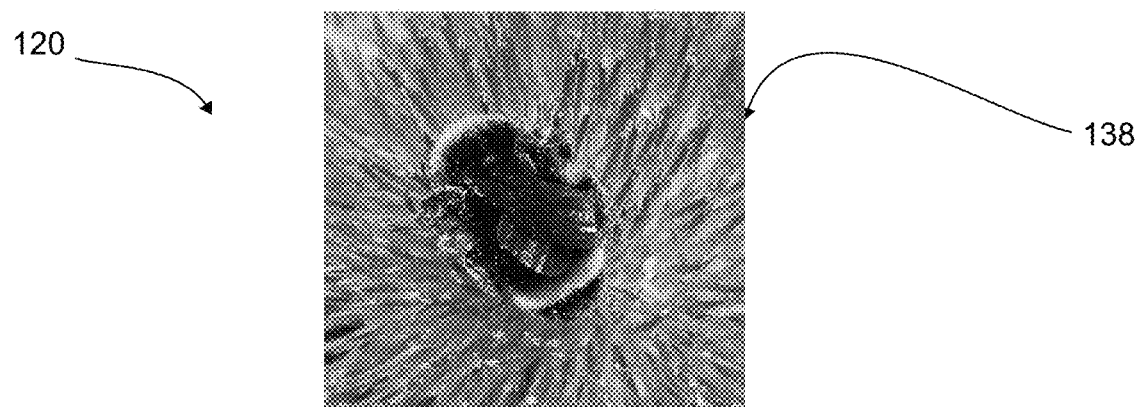
FIG. 11 is the magnified region of interest of FIG. 10.

Referring now to FIGS. 10 and 11, FIG. 10 depicts the subject 118 in the subsequent image 120, while FIG. 11 is a magnified image of the region of interest 138 of FIG. 10. The subject 118 can be a bee, on flower, and against an out-of-focus background.

Only part of the image of FIG. 10 is in full focus; the difference therefore, between V0 and V1, is large. Illustratively, this is shown to be a V0 of 53.0 and a V1 of 2.3, for the whole subsequent image 120 of FIG. 10. Most of the subsequent image 120 is out-of-focus, this leads to the relatively small value of V0. As will be appreciated, the flower and the bee found in the region of interest 138, of FIG. 11, are in good focus, hence the value of V0 is much larger at 476.0.

As illustrated by FIG. 10, the entire image can be analyzed to determine the V0 and then blurred and remeasured to produce V1 for the whole of the subsequent image 120. As illustrated by FIG. 11, the magnified region of interest 138 can be analyzed to determine V0 and then blurred and measured to produce V1 for only the region of interest 138.

Figure 12:
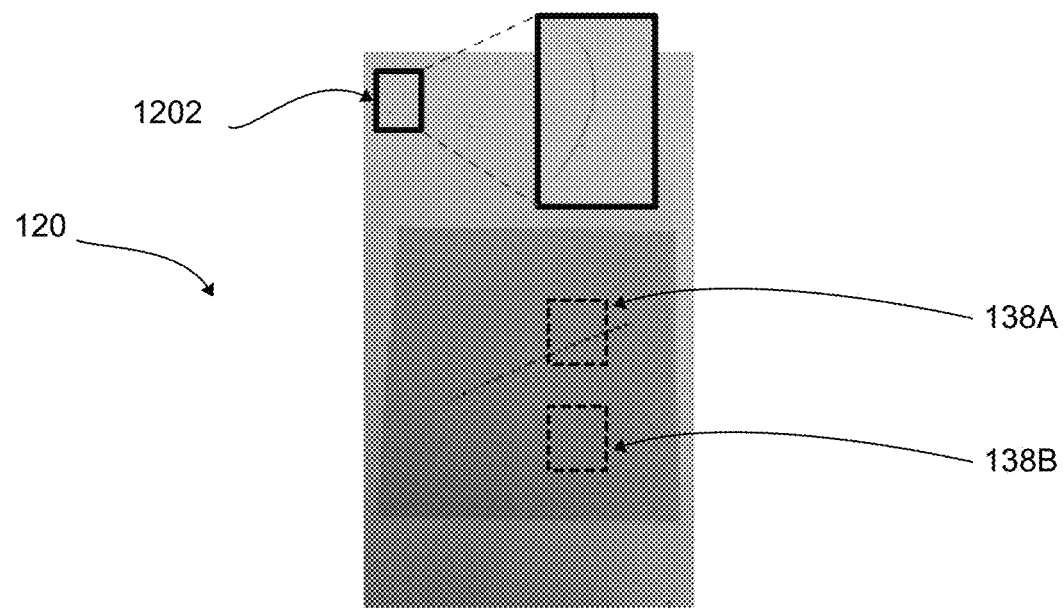
FIG. 12 is the subject in the subsequent image of FIG. 1.
Figure 13:
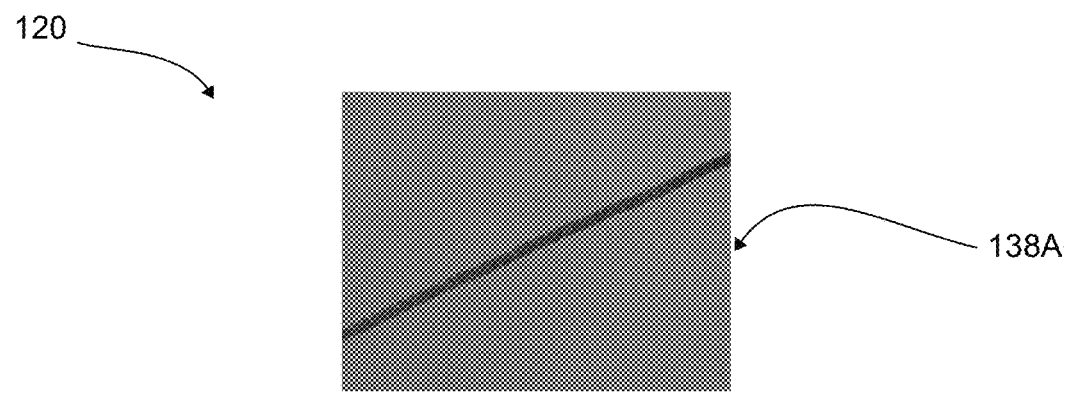
FIG. 13 is the magnified region of interest 138A of FIG. 12.
Figure 14:
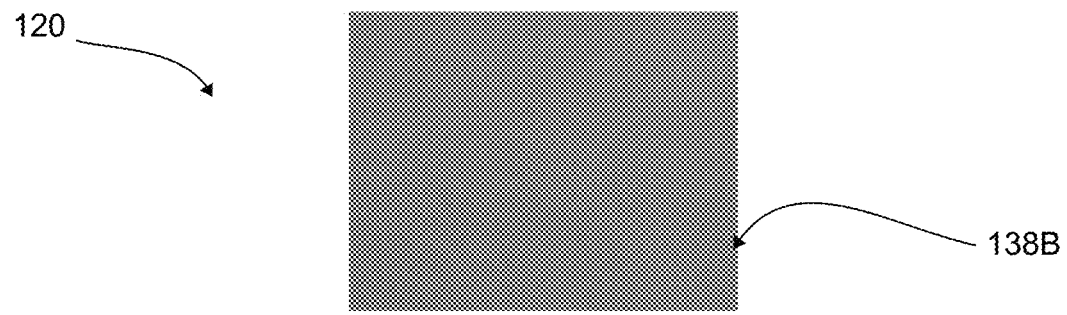
FIG. 14 is the magnified region of interest 138B of FIG. 12.

Referring now to FIGS. 12-14, FIG. 12 depicts the subject 118 in the subsequent image 120, while FIG. 13 is a magnified image of the region of interest 138A of FIG. 12, and FIG. 14 is a magnified image of the region of interest 138B of FIG. 12.

The subject 118 of FIG. 12 can be a line on a piece of paper on a white counter. The entire subsequent image 120 can be well focused as illustrated by the magnified region 1202 showing a magnified hair in proper focus.

As will be appreciated, the value of V0 for FIGS. 12-14 can be low due to the subsequent image 120 having very minor or little detail. Illustratively, V0 for FIG. 12 can be 46.5, V0 for FIG. 13 can be 85.2, and V0 for FIG. 14 can be 34.8 while V1 for FIG. 12 can be 1.1, V1 for FIG. 13 can be 1.5, and V1 for FIG. 14 can be 1. It is contemplated that the values of V0 for FIGS. 12-14 can provide a good reference point for a "minimum" value for in-focus images.

Figure 15:
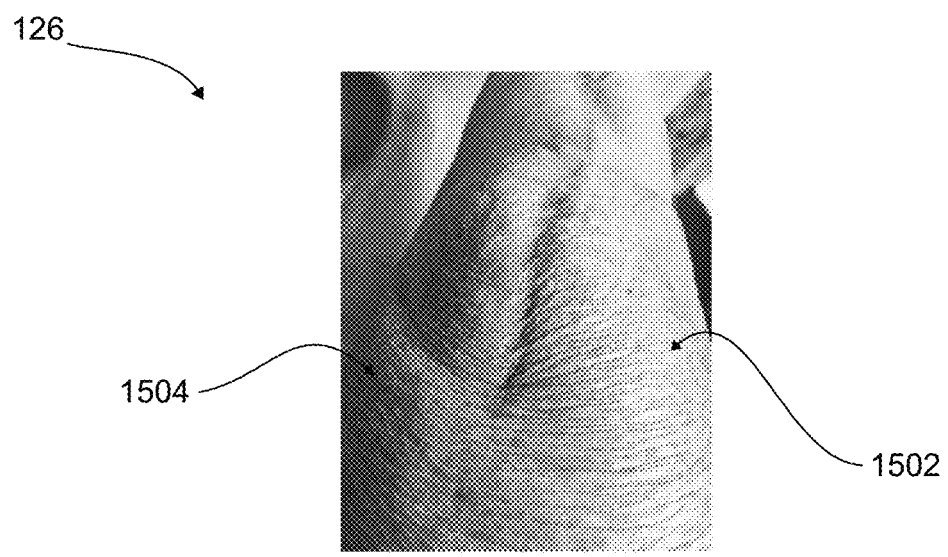
FIG. 15 is the problem image of FIG. 1.

Referring now to FIG. 15, therein is shown the problem image 126 of FIG. 1. The problem image 126 is shown having a very bright area 1502 and a very dark area 1504. As will be appreciated, this is reflected in the problem image histogram 1600 of FIG. 16 for the problem image 126.

Figure 16:
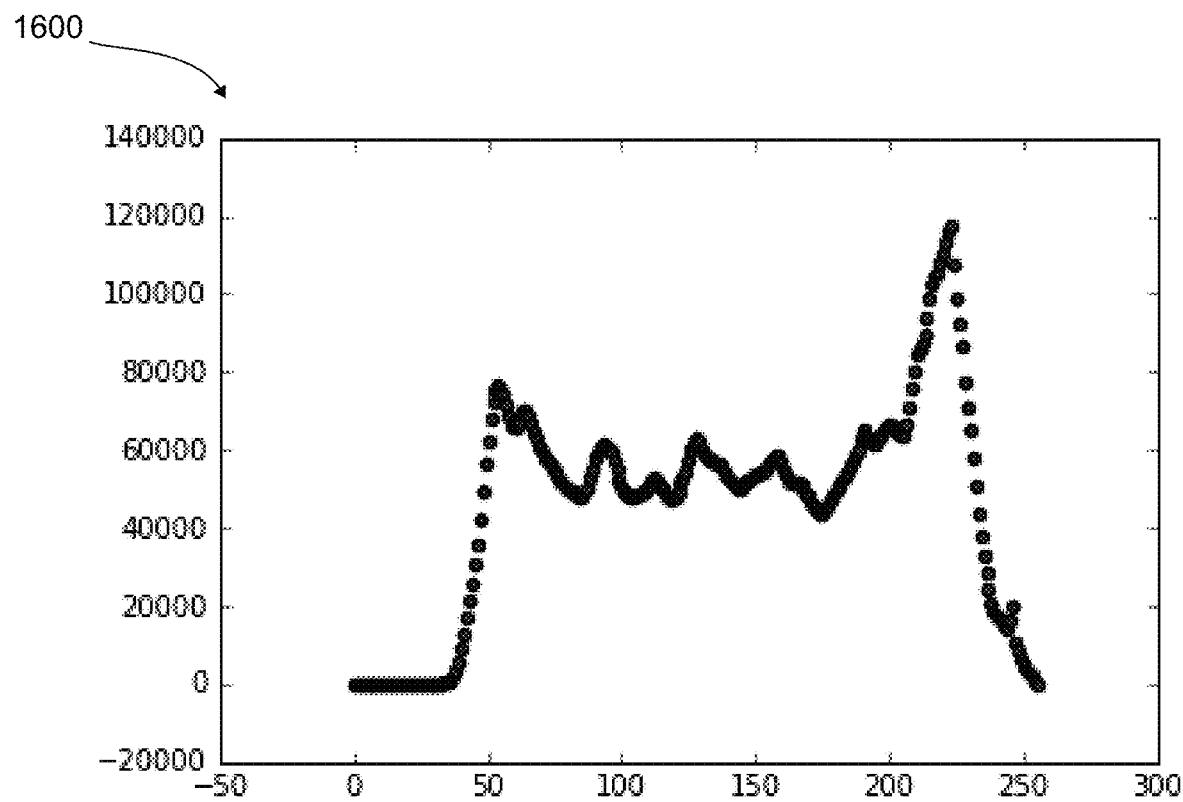
FIG. 16 is a problem image histogram for the problem image of FIG. 15.

Referring now to FIG. 16, therein is shown the problem image histogram 1600 for the problem image 126 of FIG. 15. The image histogram 1600 can be a monochromatic intensity histogram in the RGB domain. It is alternatively contemplated that the image histogram could be a color histogram in other implementations.

The problem image histogram 1600 can include a left side representing blacks or shadows, a right side representing highlights or bright areas and a middle section representing mid-tones. How high the peaks of the problem image histogram 1600 reach represent the number of pixels from the problem image 126 of FIG. 1 that fall within each particular tone. The problem image histogram 1600 is shown having peaks near the left and right sides of the graph indicating poor lighting, which could be from or include highly directional lighting.

As will be appreciated by those of ordinary skill in the art, the image histogram 1600 includes pixel values from near saturation around 255 and from below 50. This indicates large contrast because the width of the image histogram is very broad.

Figure 17:
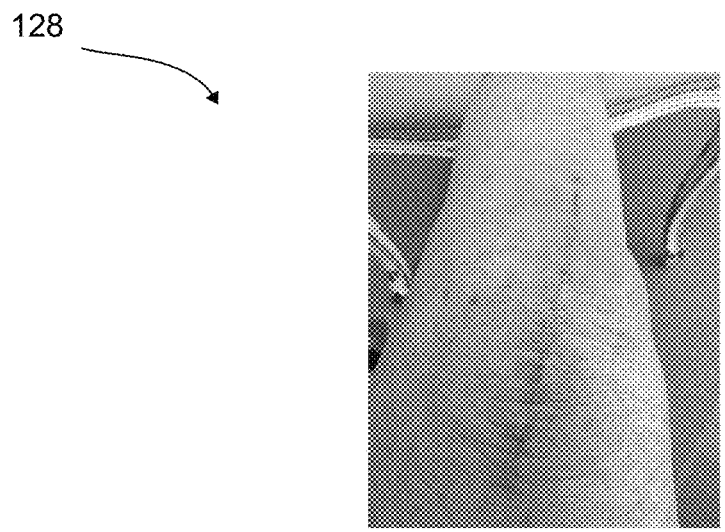
FIG. 17 is the good image of FIG. 1.

For descriptive clarity the width of the image histogram 1600 can be compared with the good image histogram 1700 of FIG. 17 for the good image 128 of FIG. 1. As will be appreciated the width of the good image histogram 1700 for the good image 128 of FIG. 17 is much narrower than the width of the image histogram 1600, due to the high contrast of the problem image 126 of FIG. 15.

Referring now to FIG. 17, therein is shown the good image 128 of FIG. 1. The good image 128 is shown having good even lighting without saturation. Notably, the very bright area 1502 of FIG. 15 and the very dark area 1504 of FIG. 15 are not evident in the good image 128. As will be appreciated, the good even lighting is reflected in the good image histogram 1800 of FIG. 18 for the good image 128.

Figure 18:
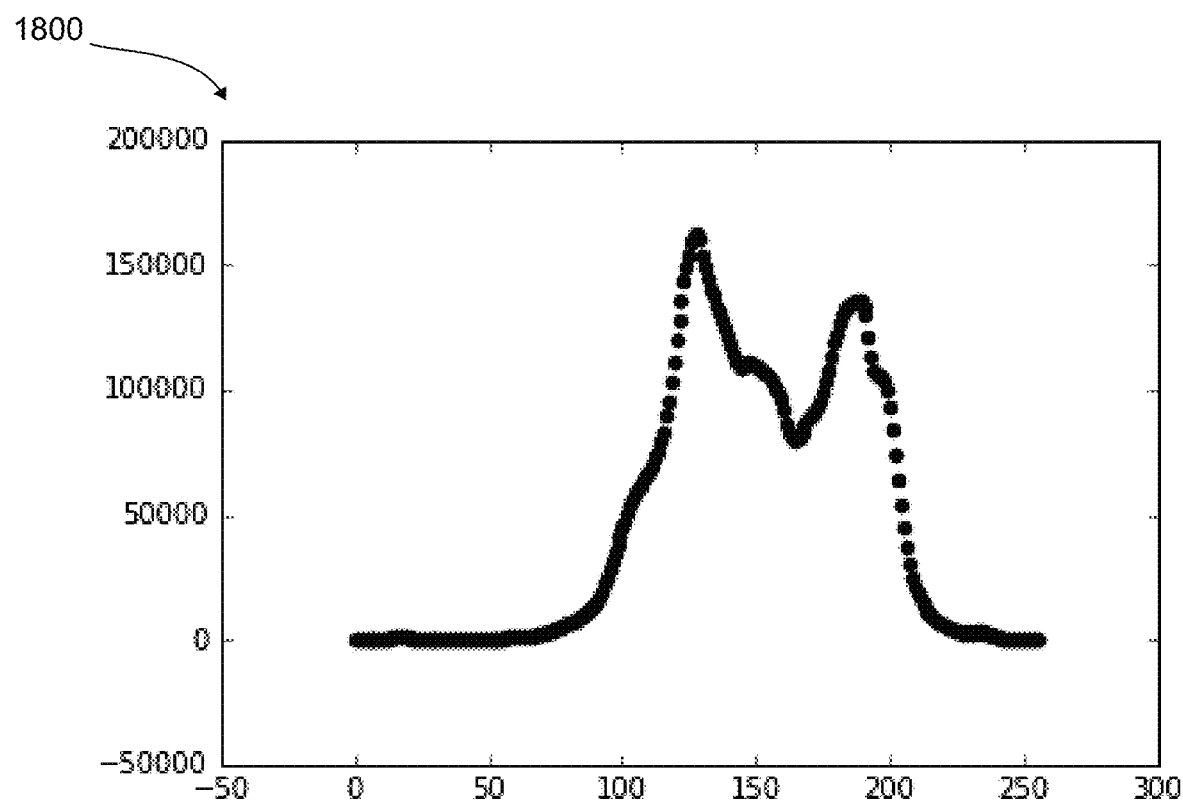
FIG. 18 is a good image histogram for the good image of FIG. 17.

Referring now to FIG. 18, therein is shown the good image histogram 1800 including a left side representing blacks or shadows, a right side representing highlights or bright areas, and a middle section representing mid-tones. How high the peaks of the problem image histogram 1800 reach represent the number of pixels from the good image 128 of FIG. 1 that fall within each particular tone. The good image histogram 1800 is shown having peaks near the middle of the chart indicating proper lighting.

Figure 19:
FIG. 19 is an underexposed image such as the problem image of FIG. 1.

Referring now to FIG. 19, therein is shown an underexposed image such as the problem image 126 of FIG. 1. The problem image 126 is shown having a very dark area 1904. As will be appreciated, the dark area 1904 is reflected in the problem image histogram 2000 of FIG. 20 for the problem image 126.

Figure 20:
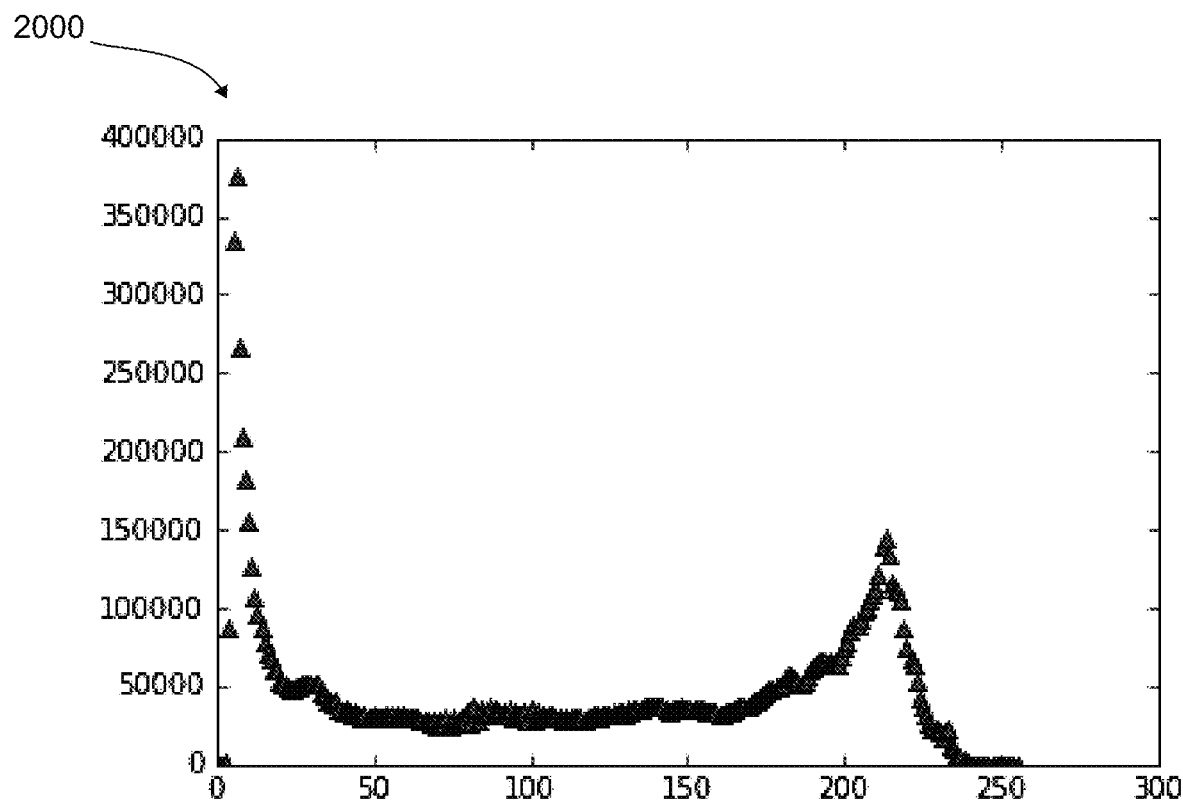
FIG. 20 is a problem image histogram for the problem image of FIG. 19.

Referring now to FIG. 20, therein is shown the problem image histogram 2000 including a left side representing blacks or shadows, a right side representing highlights or bright areas and a middle section representing mid-tones. How high the peaks of the problem image histogram 2000 reach represent the number of pixels from the problem image 126 of FIG. 1 that fall within each particular tone. The problem image histogram 2000 is shown having a large peak near the left of the chart indicating underexposure. It has been discovered that underexposed images are not correctable and must be disregarded.

Underexposed images can be detected based on the problem image histogram 2000 including a pixel having a value exceeding an underexposure threshold. Illustratively, for example, the underexposure threshold could be set to 10% of the RGB scale or 25; in which case, if a pixel within the problem image 126 is detected having an RGB value of below 25, the image would exceed the underexposure threshold. Here, the problem image histogram 2000 depicts multiple pixel values falling below a 10% threshold, which are shown to be the values to the left of the intensity value 25. In such cases, the user would be prompted and informed to retake the subsequent image 120 using audio, visual, or haptic feedback.

Figure 21:
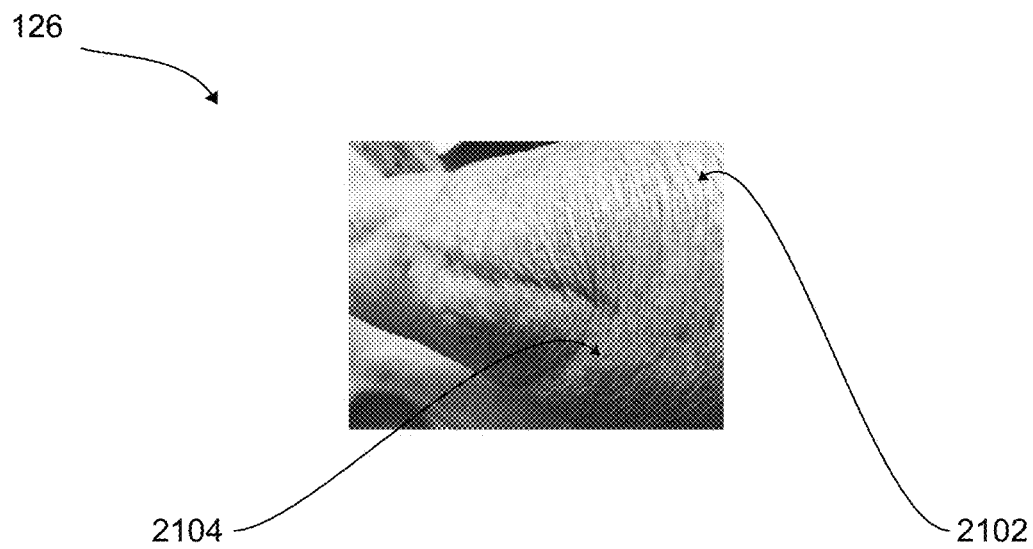
FIG. 21 is an image with high contrast and close to saturation such as the problem image of FIG. 1.

Referring now to FIG. 21, therein is shown an image with high contrast and close to saturation such as the problem image 126 of FIG. 1. The problem image 126 is shown having a light area 2102 and a dark area 2104. As will be appreciated, the dark area 2104 and the light area 2102 are reflected in the problem image histogram 2200 of FIG. 22 for the problem image 126.

Figure 22:
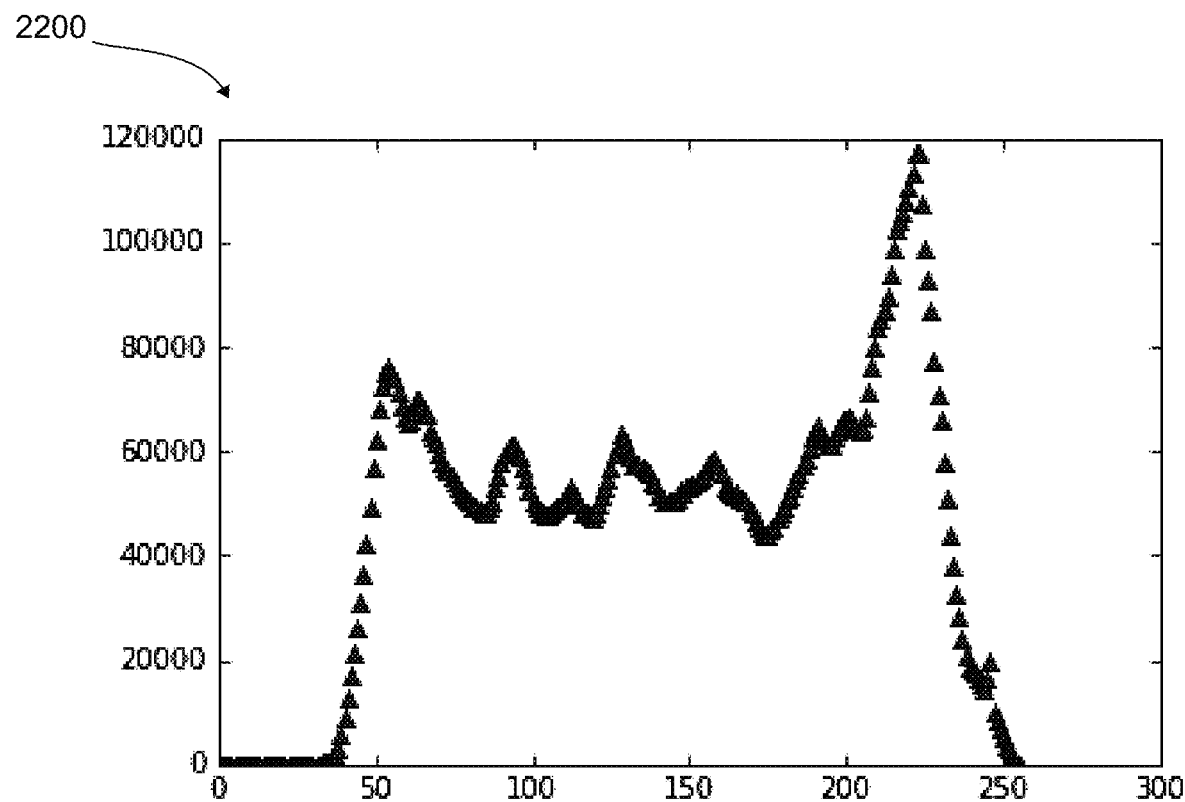
FIG. 22 is a problem image histogram for the problem image of FIG. 21.

Referring now to FIG. 22, therein is shown the problem image histogram 2200 including a left side representing blacks or shadows, a right side representing highlights or bright areas and a middle section representing mid-tones. How high the peaks of the problem image histogram 2200 reach represent the number of pixels from the problem image 126 of FIG. 1 that fall within each particular tone. The problem image histogram 2200 is shown having a peak indicating high contrast near the left of the chart and a peak indicating over exposure at the right side of the chart.

It will be appreciated that the problem image 126 can be correctable because it does not include pixels falling below an underexposure threshold, of 25 for example, nor does the problem image 126 include pixels exceeding a saturation threshold by including pixel values of 255, for example. Since the image histogram 2200 for the problem image 126 does not exceed either the underexposure threshold or the saturation threshold, the image histogram 2200 can be adjusted or compressed using an adjustment curve, such as the first adjustment curve 3402 of FIG. 34 or the transfer adjustment curve 4302 of FIG. 43.

Figure 40:
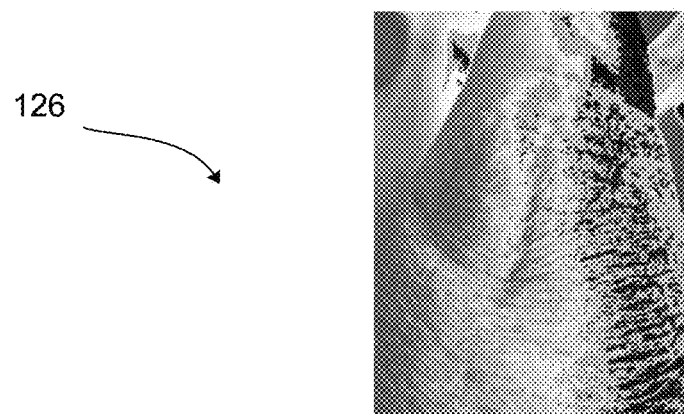
FIG. 40 is the problem image of FIG. 1 after an unsuccessful color match phase.

Illustratively, for example, the adjustment curve could be used to increase or raise pixel values within a lower third of the exposure histogram and lower or decrease the pixel values within an upper third of the exposure histogram. Raising the pixel values falling within the lower third can decrease the number of pixels within the lower third of the exposure histogram, which enables color matching. Otherwise, as is shown in FIG. 40, color matching could fail.

Decreasing the pixel values falling within the upper third can decreasing the number of pixels within the upper third of the histogram, which enables color matching. Otherwise, as shown in FIG. 40, color matching could fail.

Figure 23:
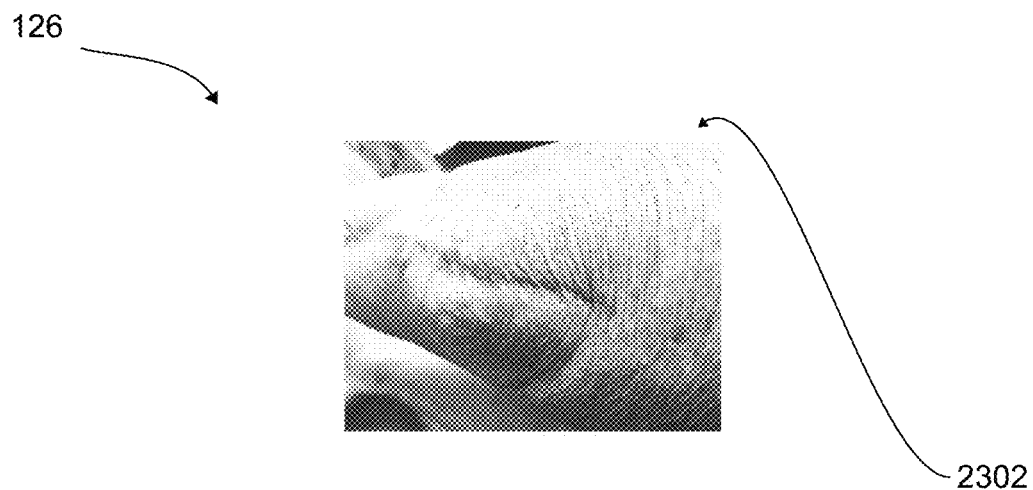
FIG. 23 is an overexposed image such as the problem image of FIG. 1.

Referring now to FIG. 23, therein is shown an overexposed image such as the problem image 126 of FIG. 1. The problem image 126 is shown having a very light area 2302. As will be appreciated, the light area 2302 is reflected in the problem image histogram 2400 of FIG. 24 for the problem image 126.

Figure 24:
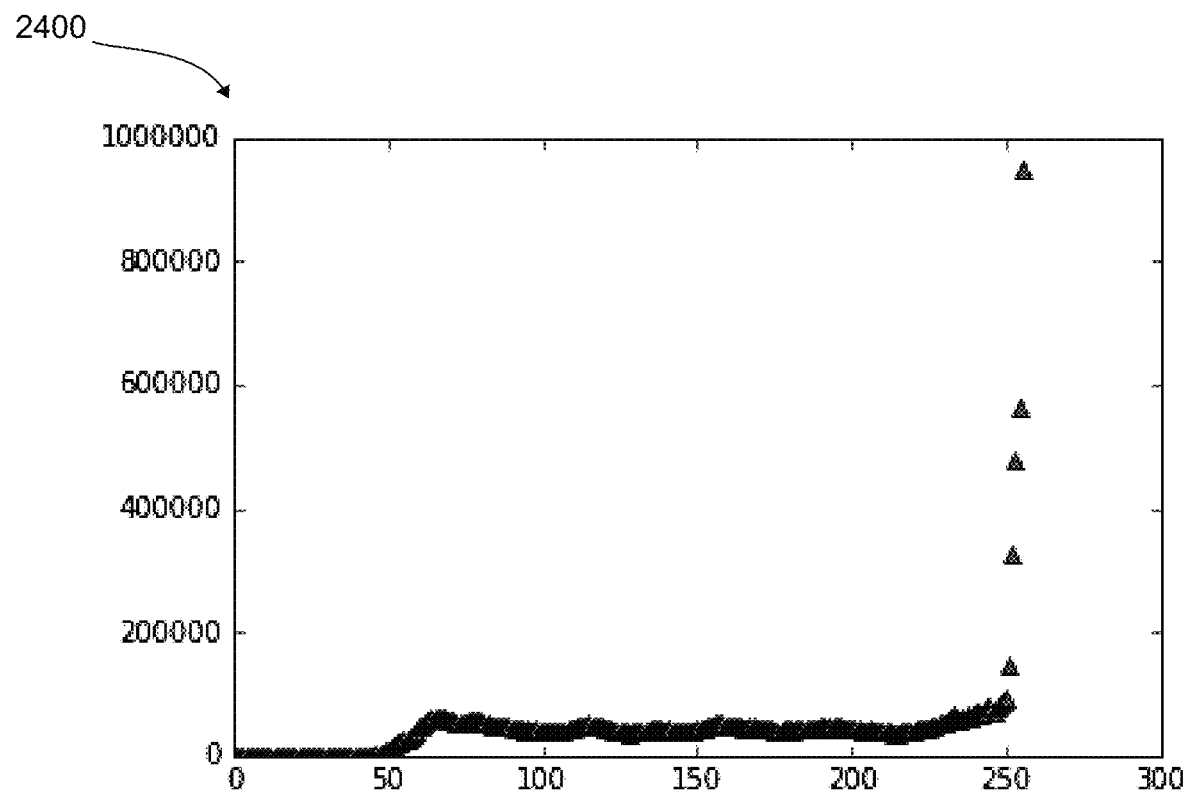
FIG. 24 is a problem image histogram for the problem image of FIG. 23.

Referring now to FIG. 24, therein is shown the problem image histogram 2400 including a left side representing blacks or shadows, a right side representing highlights or bright areas and a middle section representing mid-tones. How high the peaks of the problem image histogram 2400 reach represent the number of pixels from the problem image 126 of FIG. 1 that fall within each particular tone. The problem image histogram 2400 is shown having a large peak near the right of the chart indicating over exposure or saturation. It has been discovered that overexposed or saturated images are not correctable and must be disregarded.

Saturated or overexposed images can be detected based on the problem image histogram 2400 including a pixel having a value exceeding a saturation threshold. Illustratively, for example, the saturation threshold could be defined as greater or equal to 255, in which case if a pixel within the problem image 126 is detected having an RGB value of 255, the image would, for the purposes of this application, be understood to exceed the saturation threshold. In such cases the user would be prompted and informed to retake the subsequent image 120 using audio, visual, or haptic feedback.

Figure 25:
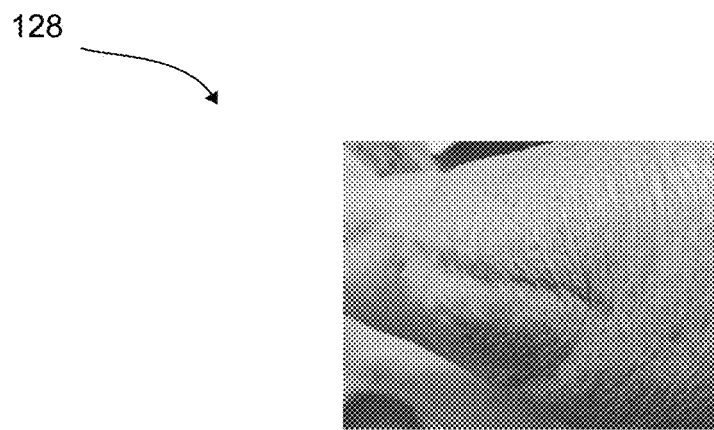
FIG. 25 is a normally saturated image such as the good image of FIG. 1.

Referring now to FIG. 25, therein is shown a normally saturated image such as the good image 128 of FIG. 1. The normal saturation of the good image 128 is reflected in the good image histogram 2600 of FIG. 26 for the good image 128.

Figure 26:
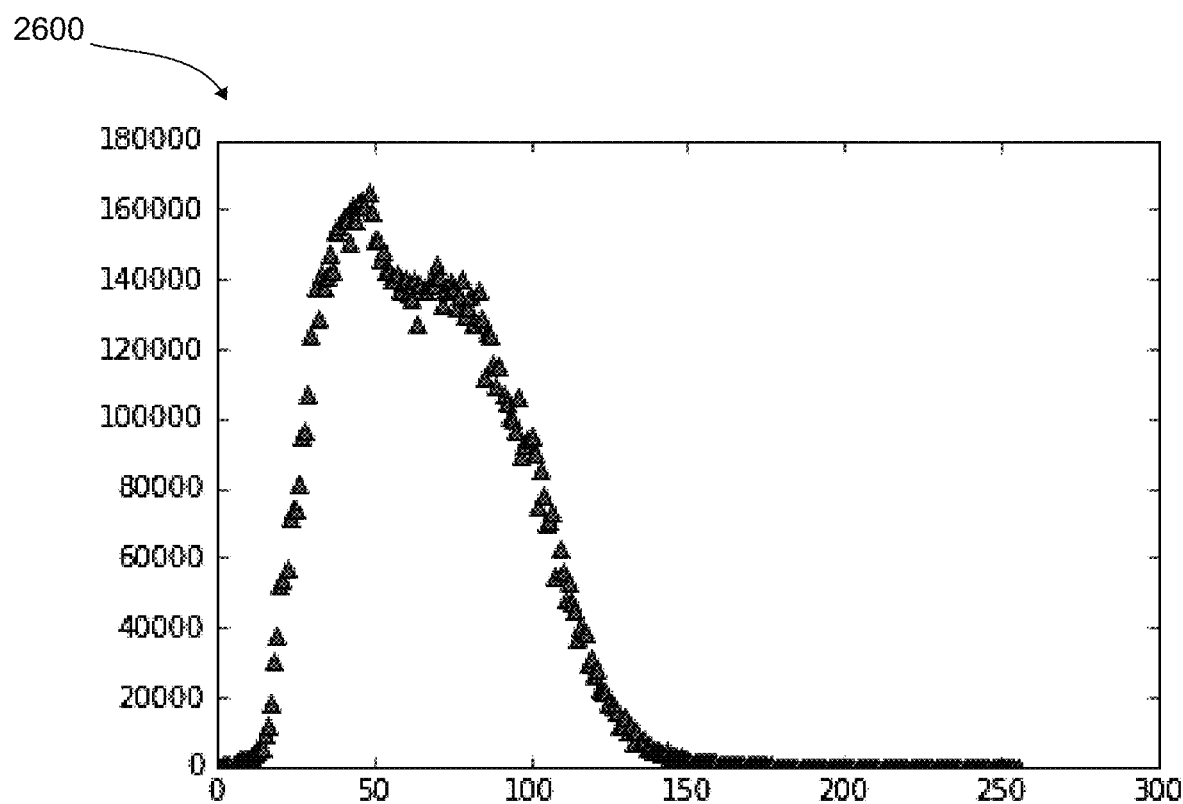
FIG. 26 is a good image histogram for the good image of FIG. 25.

Referring now to FIG. 26, therein is shown the good image histogram 2600 including a left side representing blacks or shadows, a right side representing highlights or bright areas and a middle section representing mid-tones. How high the peaks of the good image histogram 2600 reach represent the number of pixels from the good image 128 of FIG. 1 that fall within each particular tone. The good image histogram 2600 is shown having a rounded peak.

The average value of the intensity levels for the good image histogram 2600 can be 66. It is contemplated that the good image 128 could be adjusted with an adjustment curve raising pixel values within a lower third of the exposure histogram, lowering the pixel values within an upper third of the exposure histogram, or a combination thereof.

The good image histogram 2600 can be a histogram of the saturation of the good image 128 of FIG. 25. The good image histogram 2600 can indicate a normal "average saturation" for the good image 128 of FIG. 26.

Figure 27:
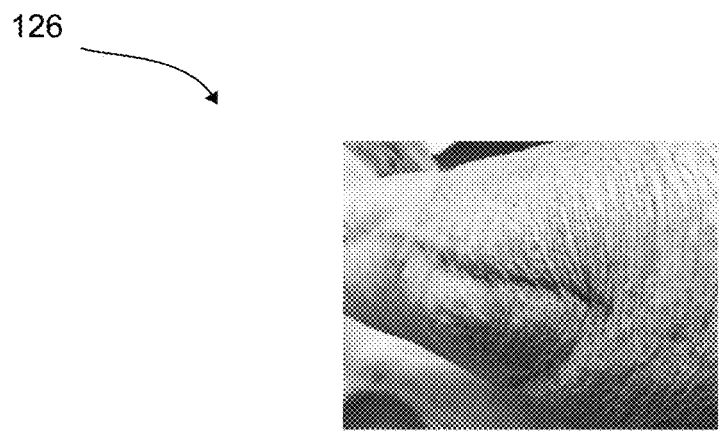
FIG. 27 is an oversaturated image such as the problem image of FIG. 1.

Referring now to FIG. 27, therein is shown an oversaturated image such as the problem image 126 of FIG. 1. The oversaturation of the problem image 126 is reflected in the problem image histogram 2800 of FIG. 28 for the problem image 126.

Figure 28:
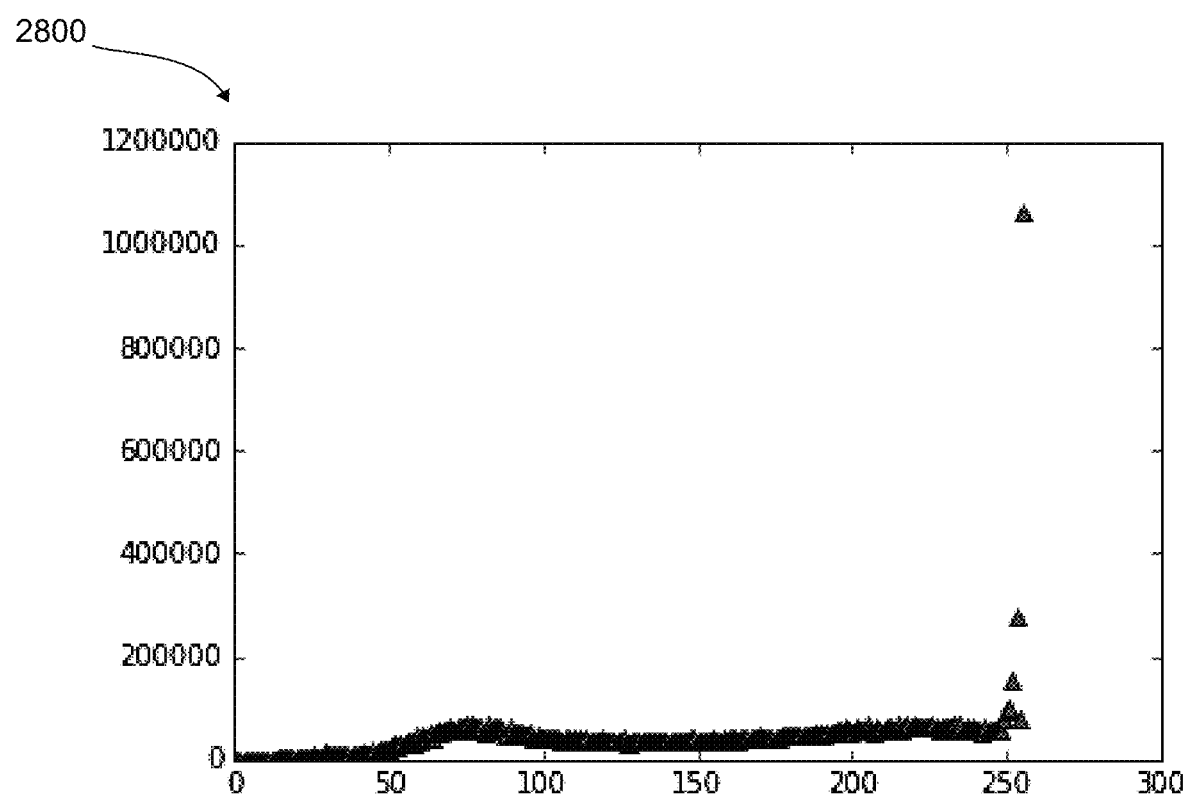
FIG. 28 is a problem image histogram for the problem image of FIG. 27.

Referring now to FIG. 28, therein is shown the problem image histogram 2800 including a left side representing blacks or shadows, a right side representing highlights or bright areas and a middle section representing mid-tones. How high the peaks of the problem image histogram 2800 reach represent the number of pixels from the problem image 126 of FIG. 1 that fall within each particular tone.

The problem image histogram 2800 can be a histogram of the saturation of the problem image 126 of FIG. 27. The problem image histogram 2800 can indicate an oversaturation for the problem image 126. More particularly, the pixel values for the problem image 126 within the problem image histogram 2800 can exceed the saturation threshold by including pixel values of 255.

Further, the image histogram 2800 can indicate an average intensity value of 167 for example. While a higher average value might support a conclusion of oversaturation, it may not be recognized as a saturated image until the saturation threshold is exceeded.

Figure 29:
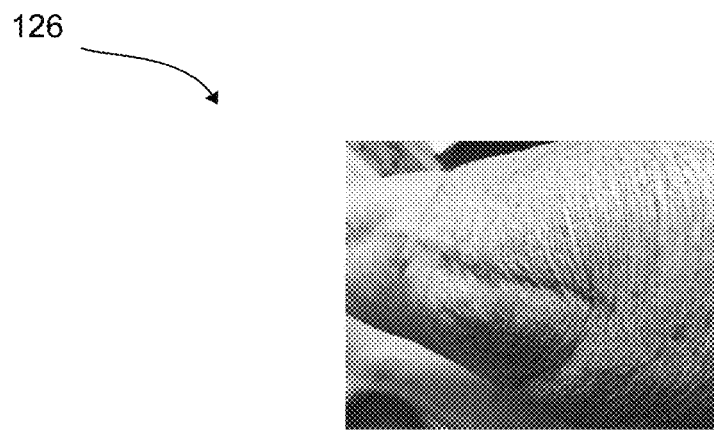
FIG. 29 is an undersaturated image such as the problem image of FIG. 1.

Referring now to FIG. 29, therein is shown an undersaturated image such as the problem image 126 of FIG. 1. The under saturation of the problem image 126 is reflected in the problem image histogram 3000 of FIG. 30 for the problem image 126.

Figure 30:
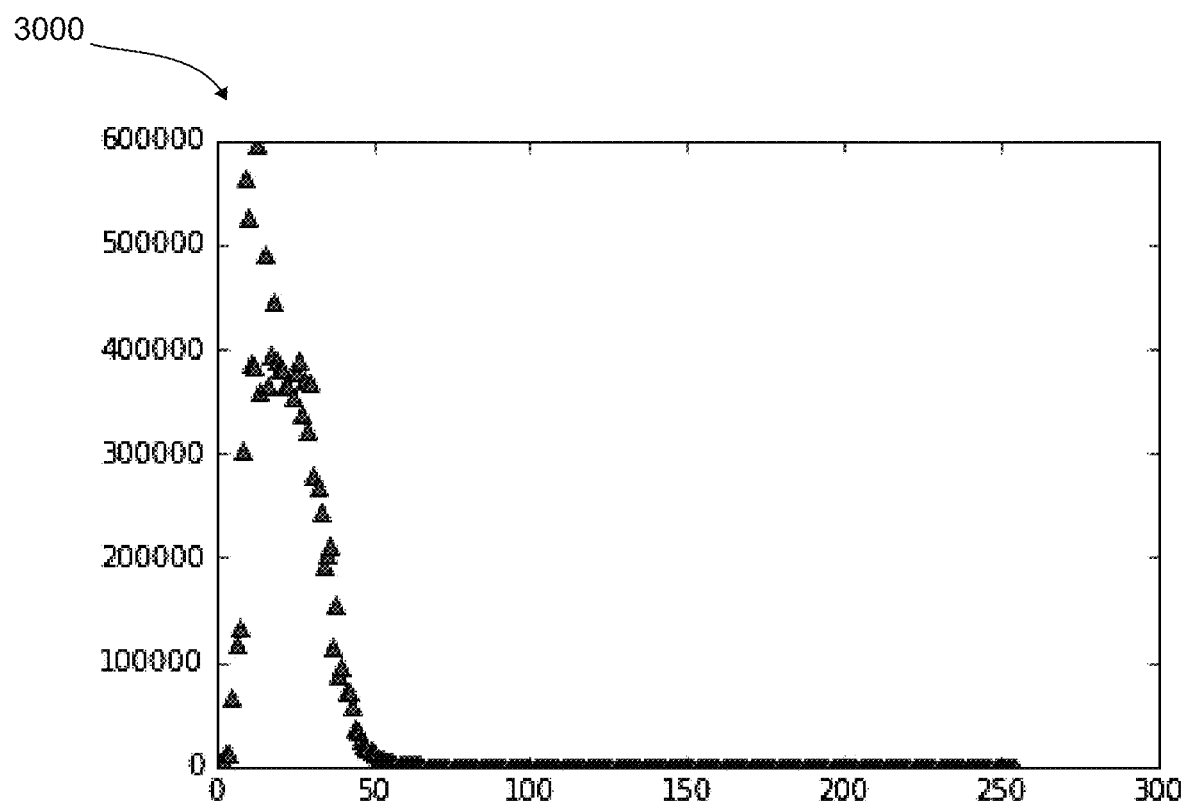
FIG. 30 is a problem image histogram for the problem image of FIG. 29.

Referring now to FIG. 30, therein is shown the problem image histogram 3000 including a left side representing blacks or shadows, a right side representing highlights or bright areas and a middle section representing mid-tones. How high the peaks of the problem image histogram 3000 reach represent the number of pixels from the problem image 126 of FIG. 1 that fall within each particular tone.

The problem image histogram 3000 can be a histogram of the saturation of the problem image 126 of FIG. 29. The problem image histogram 3000 can indicate an under saturation for the problem image 126 of FIG. 30. More particularly, with an average saturation of 21, the problem image 126 clearly would exceed the underexposure threshold if it were set to trigger based on pixel values detected below 25.

It has been discovered that the saturation problems exhibited in FIGS. 27-30 might be fixed or corrected If the underexposure threshold is not exceeded and the saturation threshold is not exceeded. That is, the subsequent image 120 of FIG. 1 can be adjusted to normal saturation levels so long as the original saturation levels of the subsequent image 120 are within a lower and upper saturation range.

Slight saturation problems, together with underexposure problems, can therefore be fixed in real time, performed at the time of color matching and correction, during image capture, or immediately after image capture. No need to adjust the saturation histogram is present with the saturation adjusting method; however, it is contemplated that adjustment of the saturation histogram may be used as a basis for image improvement.

Figure 31:
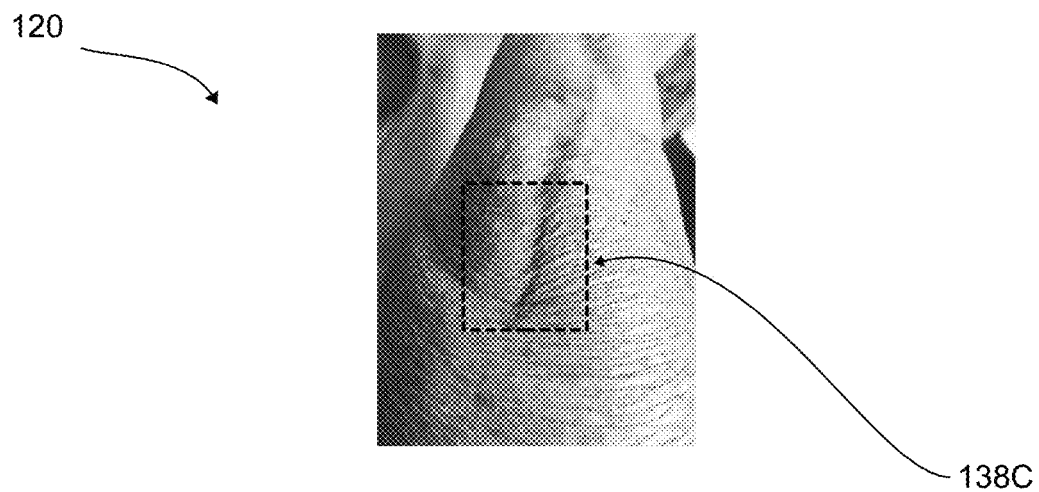
FIG. 31 is the subsequent image of FIG. 1.

Referring now to FIG. 31, therein is the subsequent image 120 of FIG. 1. The subsequent image 120 is further shown having the region of interest 138C indicated therein. As depicted by the subsequent image histogram 3302 of FIG. 33, the subsequent image 120 can be a good image 128 of FIG. 1.

Figure 32:
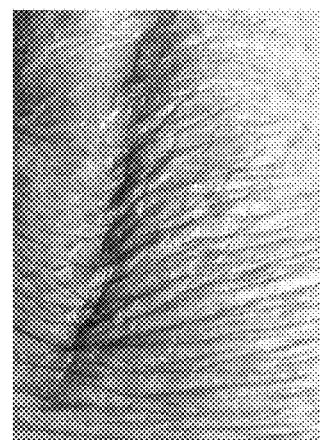
FIG. 32 is the magnified region of interest 138C of FIG. 31.

Referring now to FIG. 32, therein is shown the magnified region of interest 138C of FIG. 31. The magnified region of interest 138C shows an emphasis of wrinkles of normal skin in contrast to the structures and contours of the wound. It is contemplated that the saturation threshold and the underexposure threshold could be applied to the image as a whole or to the region of interest 138C, for example.

Figure 33:
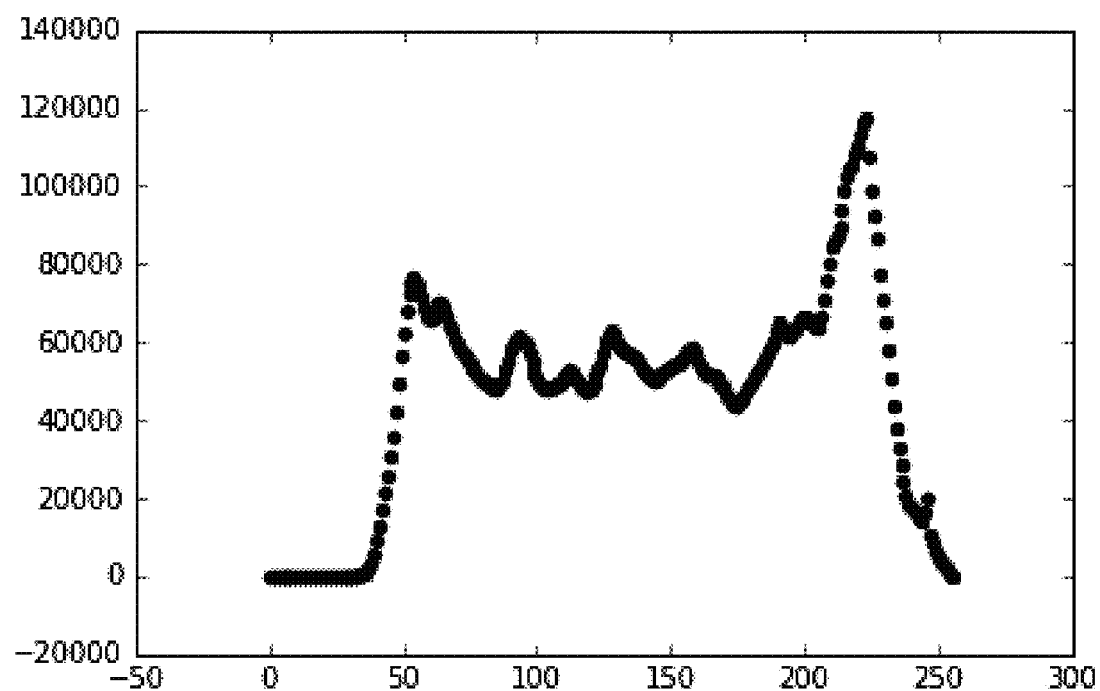
FIG. 33 is the subsequent image histogram for the subsequent image of FIG. 31.

Referring now to FIG. 33, therein is shown the subsequent image histogram 3302 for the subsequent image 120 of FIG. 31. As will be described below and appreciated by those of ordinary skill in the art, the image histograms can be compressed by applying image adjustment curves to each individual pixel value for the subsequent image histogram 3302. The adjustment curve could for example include the first adjustment curve 3402 or the second adjustment curve 3502.

Figure 34:
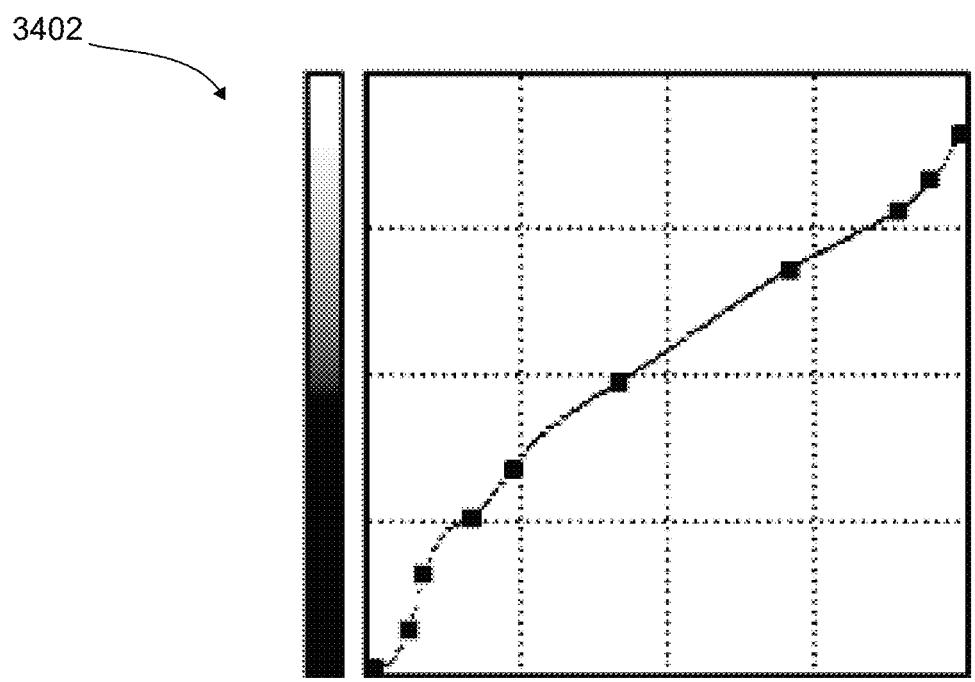
FIG. 34 is a first adjustment curve.

Referring now to FIG. 34, therein is shown a first adjustment curve 3402. The first image adjustment curve 3402 can be a photoshop adjustment curve and can be applied to each pixel value within the subsequent image histogram 3302 in order to compress the subsequent image histogram 3302. The compressed subsequent image histogram 3302 for the subsequent image 120 of FIG. 31 can be illustrated by the adjusted image histogram 3702 represented by FIG. 37 for the adjusted image 124 of FIG. 36.

Illustratively, since actual scenes, for example of the subject 118, contain a greater dynamic range of light than can be reproduced within the subsequent image 120, the tonal range, represented by the subsequent image histogram 3302, can be compressed with the use of the first adjustment curve 3402. The first adjustment curve 3402 can be implemented to transform an intensity value, such as an input value x in the image, to another value, such as an output value y. It is contemplated that there should ideally be 1-to-1 correspondence between the input value x and the output value y. Further, for every y value there should be only one x value.

Figure 35:
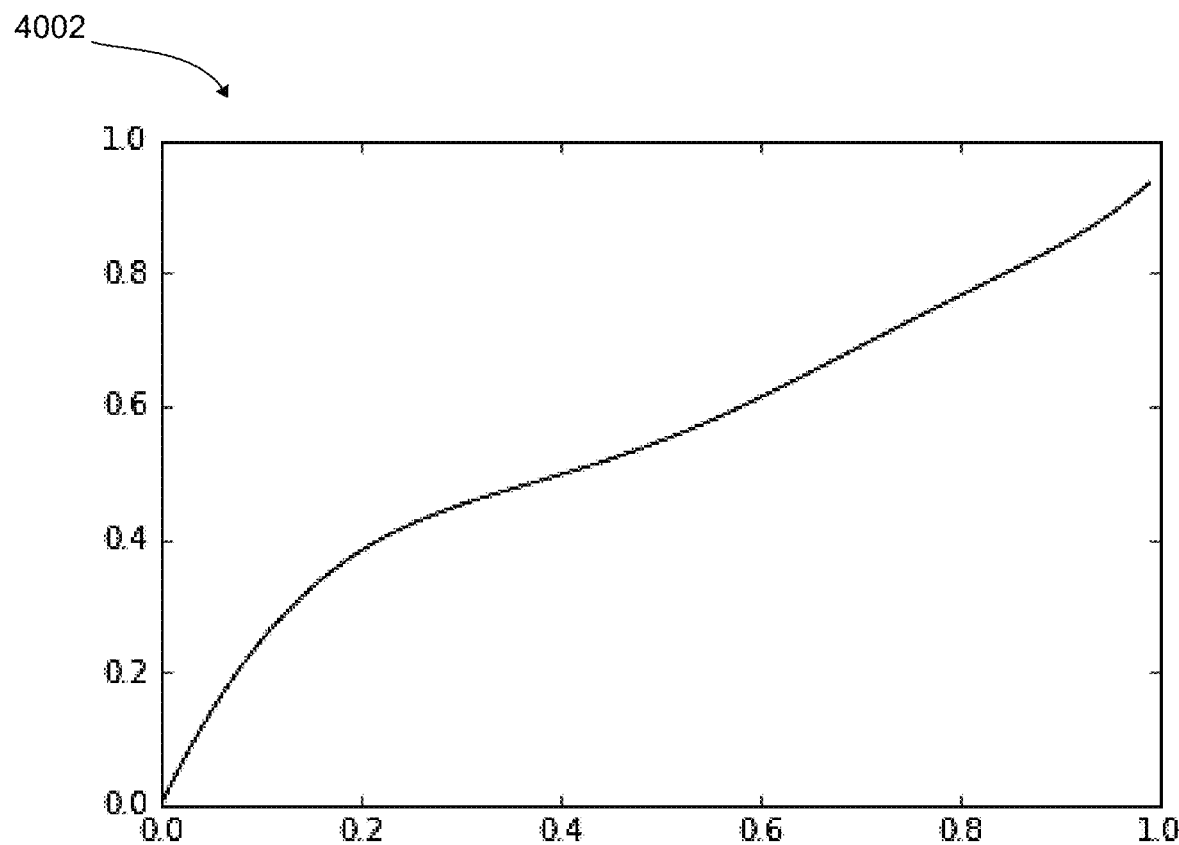
FIG. 35 is a second adjustment curve.

Referring now to FIG. 35, therein is shown a second adjustment curve 3502. The second image adjustment curve 3502 can be applied to each pixel value within the subsequent image histogram 3302 in order to compress the subsequent image histogram 3302. The compressed subsequent image histogram 3302 for the subsequent image 120 of FIG. 31 can be illustrated by the adjusted image histogram 3702 represented by FIG. 37 for the adjusted image 124 of FIG. 36.

Illustratively, since actual scenes, for example of the subject 118, contain a greater dynamic range of light than can be reproduced within the subsequent image 120, the tonal range, represented by the subsequent image histogram 3302, can be compressed with the second adjustment curve 3502. The second adjustment curve 3502 can be implemented to transform an intensity value, such as an input value x in the image, to another value, such as an output value y. It is contemplated that there should ideally be 1-to-1 correspondence between the input value x and the output value y. Further, for every y value there should be only one x value.

Illustratively, for example, the second adjustment curve 3502 can represent the input value x along the horizontal axis and the output value y along the vertical axis. In this illustrative example, when the value of x is measured at 0.16, the output value of y can be calculated to 0.25, which is brighter. Further, when the value of x is measured at 0.50, the output value of y can be calculated to 0.55, which is brighter.

Continuing with the above example, when the value of x is measured at 0.85, the output value of y can be calculated to 0.75, which is darker. Further, when the value of x is measured at 1.0, the output value of y can be calculated to 0.92, which is darker.

Figure 36:
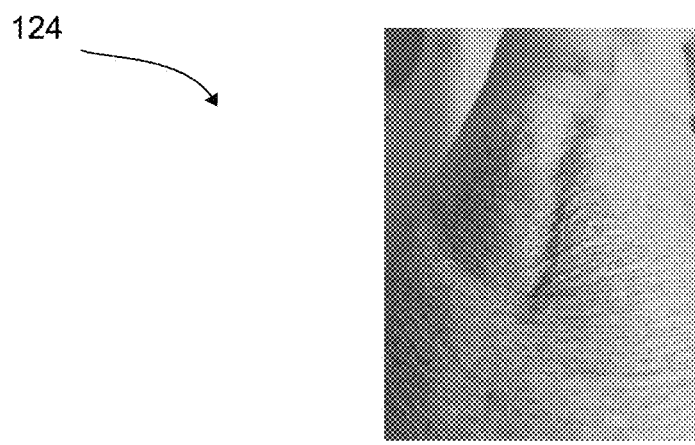
FIG. 36 is the adjusted image of FIG. 1 after an adjustment phase.
Figure 37:
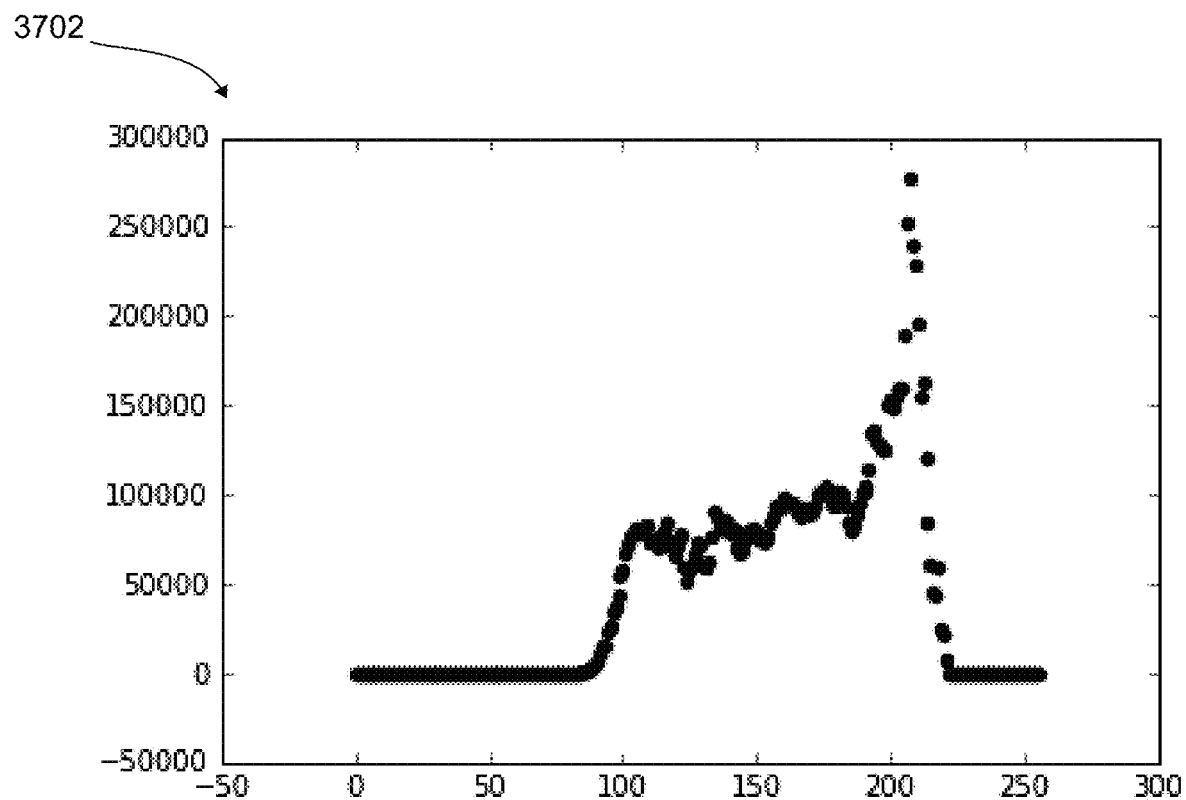
FIG. 37 is an adjusted image histogram for the adjusted image of FIG. 36.

As will be appreciated by those of ordinary skill in the art, the subsequent image histogram 3302 for the subsequent image 120 can be compressed in this way, using the second adjustment curve 3502, to produce the adjusted image histogram 3702 represented by FIG. 37 for the adjusted image 124 of FIG. 36.

Figure 38:
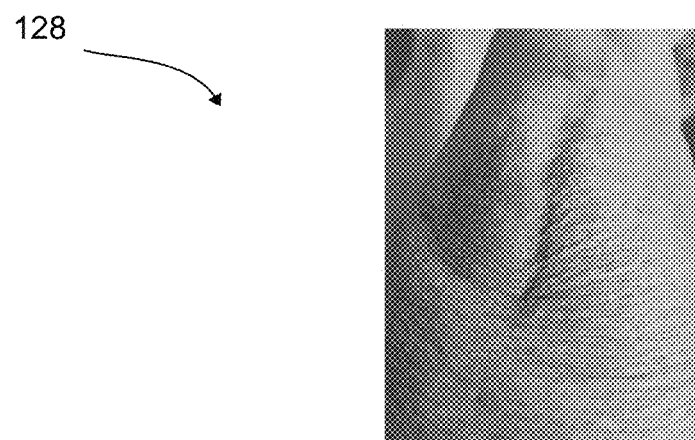
FIG. 38 is the good image of FIG. 1 after a successful color match phase.

Referring now to FIG. 36, therein is shown the adjusted image 124 of FIG. 1 after an adjustment phase. The adjusted image 124 is depicted having the lighter areas darkened and the darker areas lightened when viewed in relation to the subsequent image 120 of FIG. 31. Once the adjusted image 124 has been adjusted by compressing the subsequent image histogram 3302 with the second adjustment curve 3502, the adjusted image 124 can be color matched for example as is depicted in FIG. 38.

Referring now to FIG. 37, therein is shown an adjusted image histogram 3702 for the adjusted image 124 of FIG. 36. The adjusted image histogram 3702 could be the y output from applying the second adjustment curve 3502 of FIG. 35 to the pixel intensity values of the subsequent image histogram 3302 of FIG. 33.

As will be appreciated, the adjusted image histogram 3702 can have a width less than the subsequent image histogram 3302. This can result from the application of the second adjustment curve 3502 to the subsequent image histogram 3302.

Applying the second adjustment curve 3502 to the subsequent image histogram 3302 can raise pixel values within a lower third of the subsequent image histogram 3302. Furthermore, applying the second adjustment curve 3502 to the subsequent image histogram 3302 can lower the pixel values within an upper third of the exposure histogram.

Referring now to FIG. 38, therein is shown the good image 128 of FIG. 1 after a successful color match phase. The color match could be accomplished through a Chromatic Adaptation Transform or other color matching processes.

Figure 39:
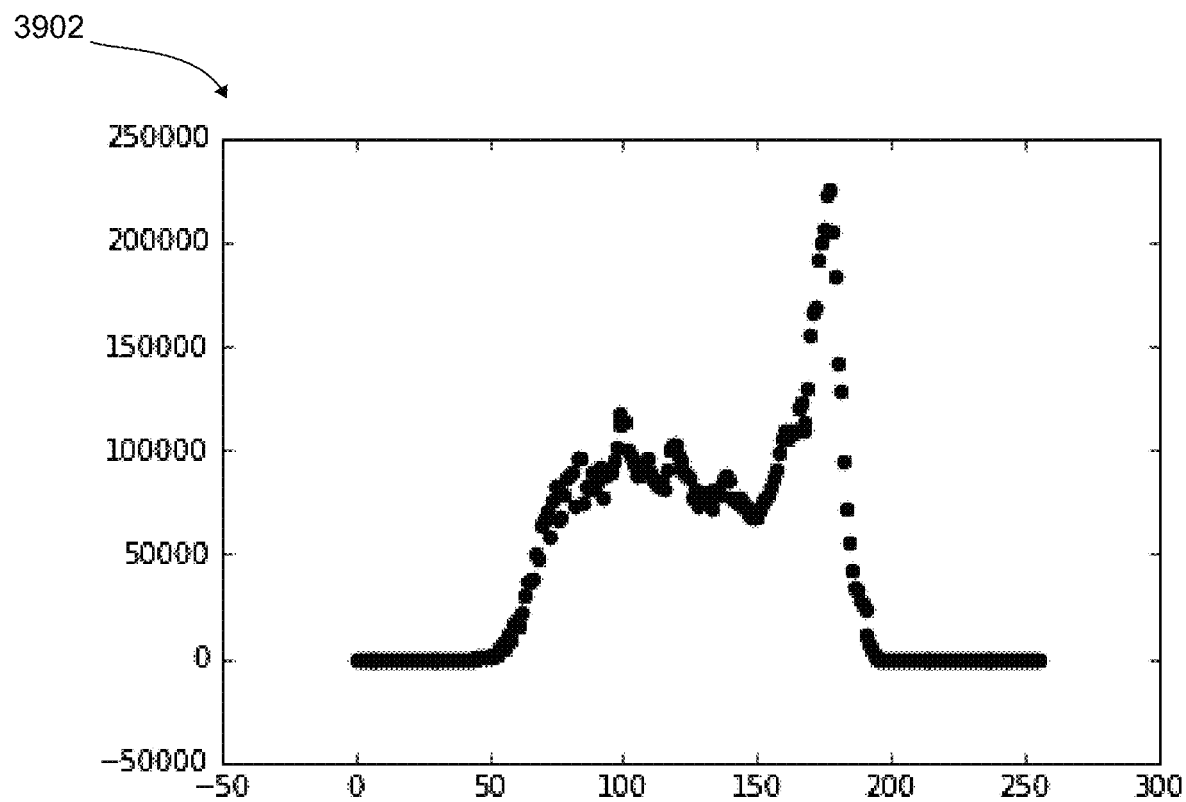
FIG. 39 is a good image histogram for the good image of FIG. 38.

Referring now to FIG. 39, therein is shown a good image histogram 3902 for the good image of FIG. 38. The good image histogram 3902 can be similar to the adjusted image histogram 3702 of FIG. 37, however the color-matching process has changed the good image histogram 3902 from that of the adjusted image histogram 3702.

Referring now to FIG. 40, therein is shown the problem image 126 of FIG. 1 after an unsuccessful color match phase. The faulty color matching can be the result of failing either the underexposure threshold or the saturation threshold meaning the image histogram for the problem image 126 was not adjustable with the adjustment curve and resulting in the problem image 126.

When the adjusted image 124 is not in condition for a proper color match, the image quality system 100 will return the problem image 126 showing improper color. Alternatively, when the adjusted image 124 is in condition for a proper color match, the image quality system 100 will return the good image 128 of FIG. 38 showing proper color.

Figure 41:
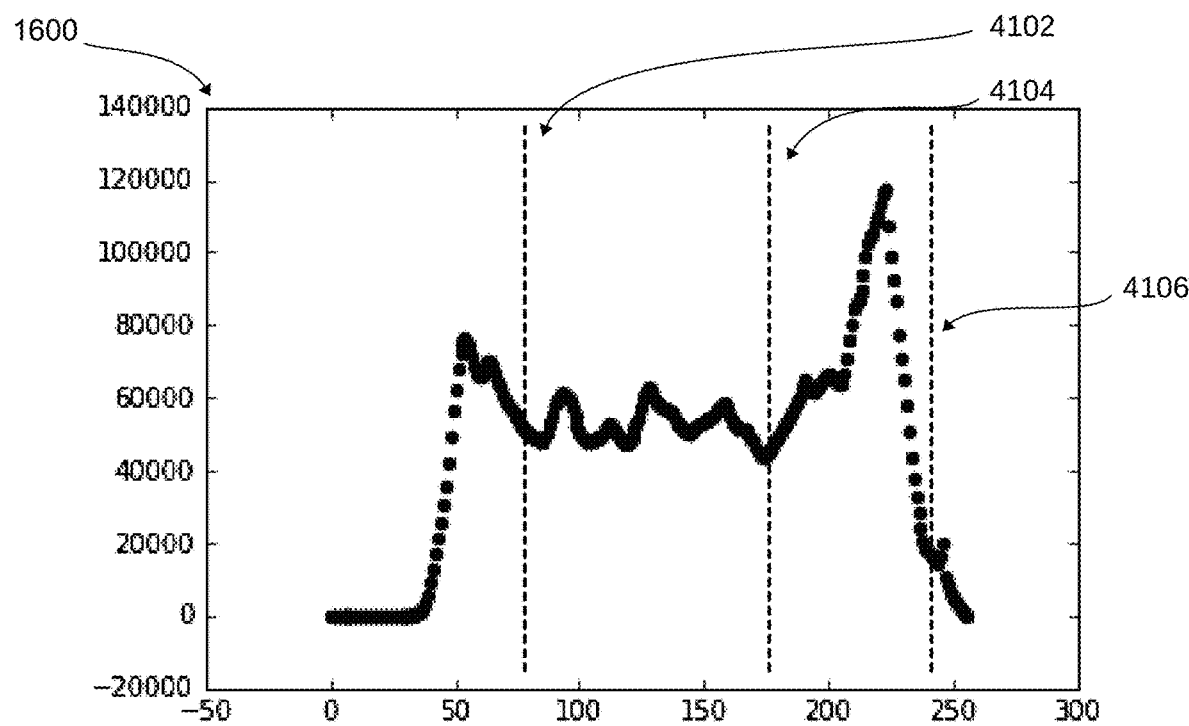
FIG. 41 is the problem image histogram of FIG. 16 depicting a top third and a bottom third.

Referring now to FIG. 41, therein is shown the problem image histogram 1600 of FIG. 16 depicting a top adjustment threshold such as a top third 4102 and a bottom adjustment threshold such as a bottom third 4104. Because the problem image histogram 1600 does not exceed the underexposure threshold or the saturation threshold, the problem image histogram 1600 can be compressed using an adjustment curve. Compressing the problem image histogram 1600 can include applying the adjustment curve to each of the values of the problem image histogram 1600 in order to generate the adjusted image histogram 3702.

Within the RGB space the top third 4102 can be defined as over 170 while the bottom third 4104 could be defined as less than 85. It is contemplated that other values could be used when alternative histograms are used, such as a color histogram. Further, as will be appreciated, a 95% portion 4106 can be defined as the portion below 242 in the RGB space.

As will be appreciated by those of ordinary skill in the art, the histogram correction method of FIGS. 41 through 55 sits in stark contrast to the histogram stretching method, the histogram stretching method being well known in computer vision arts. The processes of the histogram stretching method provide detail enhancement, the result of which would be maximum contrast.

The histogram correction method of FIGS. 41 through 55, on the other hand, includes processes for providing an ideal contrast for application such as analysis of skin rather than merely maximum contrast of the histogram stretching method. The newly disclosed histogram stretching method of FIGS. 41-55 can ensure enough contrast for details but not too much for variations in lighting and can enable computer vision to operate in ways previously only accomplished by human operators using intuitive non-technical methods of balancing contrast.

Other contemplated applications of the histogram correction method of FIGS. 41 through 55 could be contrast control to a natural state, or to good contrast balance. In some embodiments the histogram correction method of FIGS. 41 through 55 applies to brightness as well as to saturation.

Automatic correction to images with high contrast can include raising low intensities or shadows, such that the lower third of the histogram or the values falling below the bottom third 4104. The low intensity areas of an image histogram can be adjusted to reach a desired lower third count of values below the bottom third 4104.

That is, the lower intensity areas of the image histogram, below the bottom third 4104, can be adjusted until a threshold for the pixel values residing below the bottom third 4104 of the histogram is achieved. Illustratively, the threshold could be 1% or 1.5% of the pixel values falling below the bottom third 4104, for example.

The brighter areas or the right side areas of the histogram, or the values contained above the top third 4102, can be adjusted down. As is depicted the values within the upper 3% to 6% of the histogram could be adjusted down such that the value count in the 3%-6% is zero. As is depicted the number of pixel values above the 95% portion 4106 is zero.

The reason for the adjustment to the problem image histogram 1600 is to permit color correction and color matching as shown in FIGS. 38 and 39. The problem images 126 that are not correctable, such as the problem images 126 of FIGS. 19, 23, 27, and 29, can have saturated pixels or pixels with a value of 255, or can have underexposed pixels or pixels with values less than the underexposure threshold such as 5 or 10.

Importantly, the problem images 126 should be rejected and the user informed to retake the subsequent image 120 when he underexposure threshold or the saturation threshold is exceeded. This is because adjusting an underexposed pixel, having a value below the underexposure threshold, by "brightening" can add noise and result in confusion upon numerical analysis.

It is contemplated that in one illustrative example, a total count of values within the problem image histogram 1600 can be obtained as the value T. T can be filtered to determine which values fall within the bottom third 4104 of the problem image histogram 1600. The number of values falling below the bottom third 4104 can be represented by $T_{1/3}$.

The bottom third 4104 can include all values falling between 0 and 85 intensity, for example. It has been discovered that when the $T_{1/3}$ divided by the total T or ($T_{1/3}$/T=τ) is less than a correction threshold, which can, in this example be set to 0.02; the image quality system 100 can automatically adjust the problem image histogram 1600 with an adjustment curve. It is contemplated that the underexposure threshold could be implemented as $T_{1/3}$ divided by the total T times the correction threshold.

The image quality system 100 can adjust the problem image histogram 1600 values to ensure the values of the problem image histogram 1600 fall above the bottom third 4104, which in turn decreases the result of $T_{1/3}$/T. Further the values above the top third 4102 can be adjusted to ensure that any values above the upper adjustment thresholds 4504 are set to zero.

Figure 42:
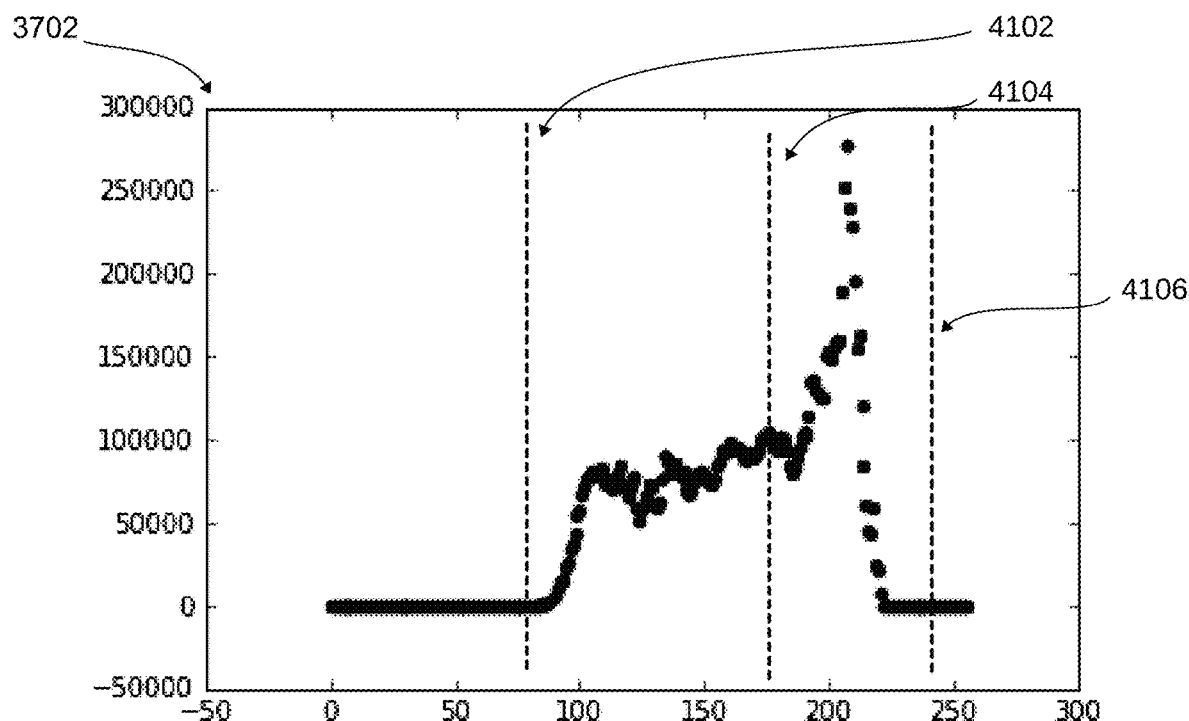
FIG. 42 is the adjusted image histogram of FIG. 37 depicting a top third, a bottom third and a 95% portion.

Referring now to FIG. 42, therein is shown the adjusted image histogram 3702 of FIG. 37 depicting the top third 4102, the bottom third 4104, and the 95% portion 4106. The adjusted image histogram 3702 depicts only roughly 1.5% of the total pixel values falling below the bottom third 4104 and zero pixel values falling above the 95% portion 4106.

As will be appreciated, the problem image histogram 1600 of FIG. 41, for example, can be adjusted with an adjustment curve to create the adjusted image histogram 3702. The adjustment curve applied could be specifically calculated to modify the values of the problem image histogram 1600 into the values of the adjusted image histogram 3702.

The values of the problem image histogram 1600 below the bottom third 4104 have been lightened using the adjustment curve to raise and compress the values of the problem image histogram 1600, which were below the bottom third 4104. Similarly, the values of the problem image histogram 1600 above the top third 4102 have been darkened using the adjustment curve to lower and compress the values, of the problem image histogram 1600, above the top third 4102 to positions below the 95% portion 4106.

Figure 43:
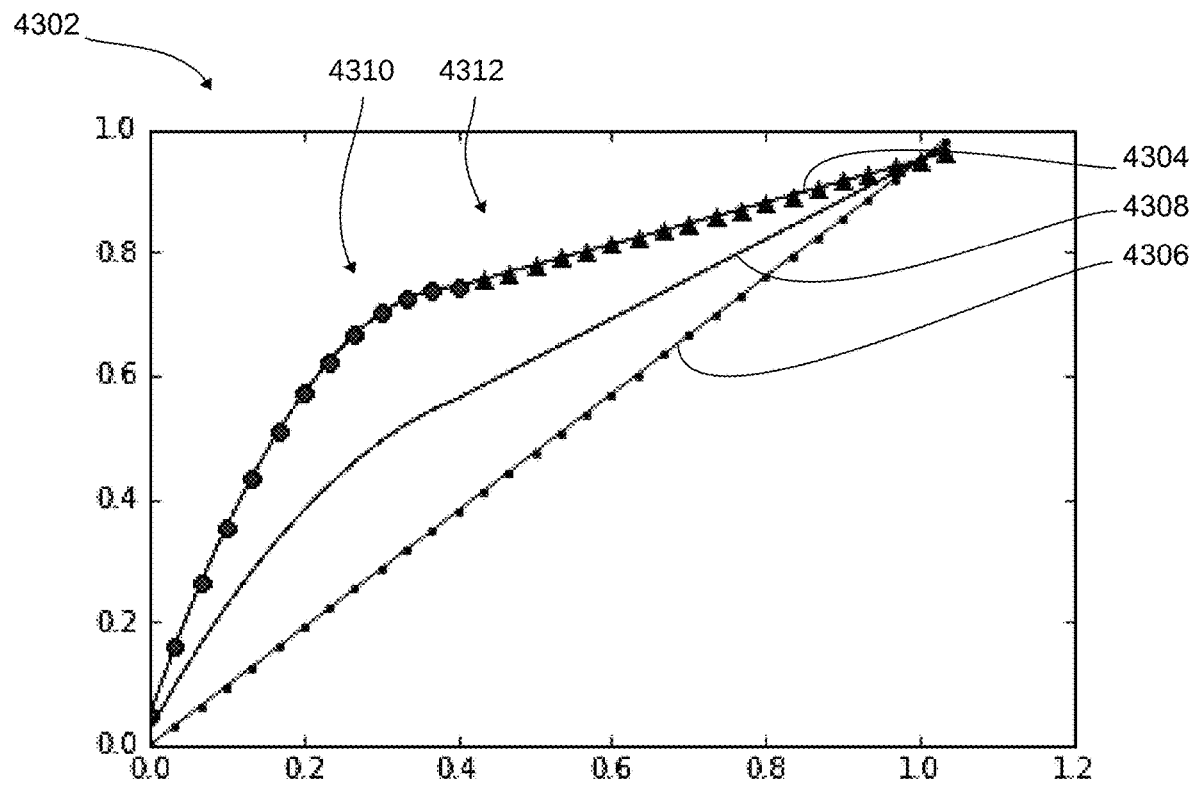
FIG. 43 is a two-part transfer adjustment curve.

Referring now to FIG. 43, therein is shown a transfer adjustment curve 4302. The transfer adjustment curve 4302 can include a two part transfer curve 4304 combined with a line transfer $y_M$ 4306 to create a combined transfer curve $Y_T$ 4308.

The two part transfer curve 4304 can include two portions, or a less than or equal $X_L$ portion 4310 and a greater $X_L$ portion 4312. It is contemplated that the less than or equal $X_L$ portion 4310 can be represented by quadratic values while the greater $X_L$ portion 4312 can be represented by linear values which will be apparent from Equations 1 and 2.

The less than or equal $X_L$ portion 4310 can obey Equation 1 for all values of $x \leq X_L$.

$$zy_1 = -bx^2 + 2bx_Lx + g \qquad \text{Equation 1}$$

The parameter $y_1$ is the vertical value of the transfer adjustment curve 4302, b is a parameter increasing "bump", g is an offset from zero which can be kept as 0, and $X_L$ which can represent the transition point from the less than or equal $X_L$ portion 4310 to the greater $X_L$ portion 4312 and is currently depicted as set at 0.4.

The greater $X_L$ portion 4312 can obey Equation 2 for all values of $x > X_L$.

$$y_2 = \omega(x-1) + a \qquad \text{Equation 2}$$

The parameter $y_2$ is the vertical value of the transfer adjustment curve 4302, the value "a" is a parameter that reduces maximum values and prevents saturation above 0.96. The value ω is a parameter that obeys Equation 3:

$$\omega = (g - a + bx_L^2)/(x_L - 1) \qquad \text{Equation 3}$$

The line transfer $y_M$ 4308 can be represented by Equation 4:

$$y_M = (a-g)x + g \qquad \text{Equation 4}$$

The combined transfer curve $Y_T$ 4306 can be represented by Equation 5:

$$Y_T = (1-f)y_Q + fy_M \qquad \text{Equation 5}$$

The parameter $y_T$ is the vertical value of the combined transfer curve $Y_T$ 4306, the value "f" is a mixing parameter or a linear offset and can have a value within the range of 0 to 1.

As will be appreciated calculating the transfer adjustment curve 4302 can require that only a fraction of the values of the subsequent image histogram 3302 of FIG. 32 be below the bottom third 4104 of FIG. 41. This is described as T above, which can be limited to 0.2 or 20% of the total values of the subsequent image histogram 3302 falling below the bottom third 4104.

Calculating the transfer adjustment curve 4302 can further require a zero count for values above the saturation threshold which can illustratively be set to 0.96, which means that if a value is detected of 255, the saturation threshold will be exceeded. This is because in this case the saturation threshold is set to 96% of the RGB intensity range, which can be a saturation threshold of 244.8.

The parameters b and f can be adjustable with b corresponding to hump size while f can be a linear offset ranging from 0 to 1. There can be a lower limit of b depending on f. Also, some combinations of b and f will make it impossible to reach desired T as described.

It is contemplated that one parameter can be adjusted at a time. Illustratively, it is contemplated that a proper value of f can be selected and set then the value of b can be adjusted by first selecting a range of b(1, 2, . . . , n), then by computing τ(b). The equation is inverted to find the $b_D$ for $τ_D$ by interpolation. $τ_D$ is the desired value. Illustratively, τ(b) can be plotted for example in FIGS. 56 and 57.

The objective is to produce an adjustment curve such as the transfer adjustment curve 4302 such that: the lower third of the histogram (τ) contains 1% to 5% of intensities, and no intensities above 96% of the saturated value. The transfer curve can have the following characteristics: the transfer curve can include a straight (line or linear) from a transition point (typically 0.4) to a second value such as 1.0. The transfer curve can further follow a quadratic curve from 0.0 to transition point. At the transition point the quadratic derivative is zero.

It is contemplated that the transfer curve can have 5 parameters, 3 of which are fixed and are not expected to change. Illustratively, parameters a, g, and $X_L$ are not expected to change in Equations 1-4 above.

For clarity, the parameter "a" can lower intensities near saturation. This permits color correction. It has been discovered that utilizing the value of 0.96 ensures any color adjustments to go smoothly without artifacts. The parameter can be the saturation threshold and can reduce maximum and prevents saturation. The parameter "a" can set forth a fraction of upper pixel value intensities such that the upper pixel value intensities above the fraction yield a count of zero within the histogram.

Further for clarity, the parameter g can brighten very dark parts of the image. However, the parameter g can also introduce noise, so it has been discovered that g should be small, or close to 0.

Further for clarity, the parameter $X_L$ should be fixed slightly above the "lower third" providing a good pivot point. The parameters b and f can be adjusted using an optimization routine.

Typically, f is fixed between 0.2 and 0.5. Only b is adjusted to meet the τ specification. The parameter b can be implemented to increase the bump.

FIGS. 44-55 can depict different parameters set for the adjustment curve that modify the subsequent image 120 of FIG. 1 to satisfy adjustment criteria for a good image 128 of FIG. 1.

That is for example, FIGS. 44, 47, 50, and 53 can be adjustment curves for generating the adjusted images 124 of FIGS. 45, 48, 51, and 54, respectively.

Further FIGS. 46, 49, 52, 55 can be adjusted histograms of the adjusted images 124 of FIGS. 45, 48, 51, and 54, respectively.

Figure 44:
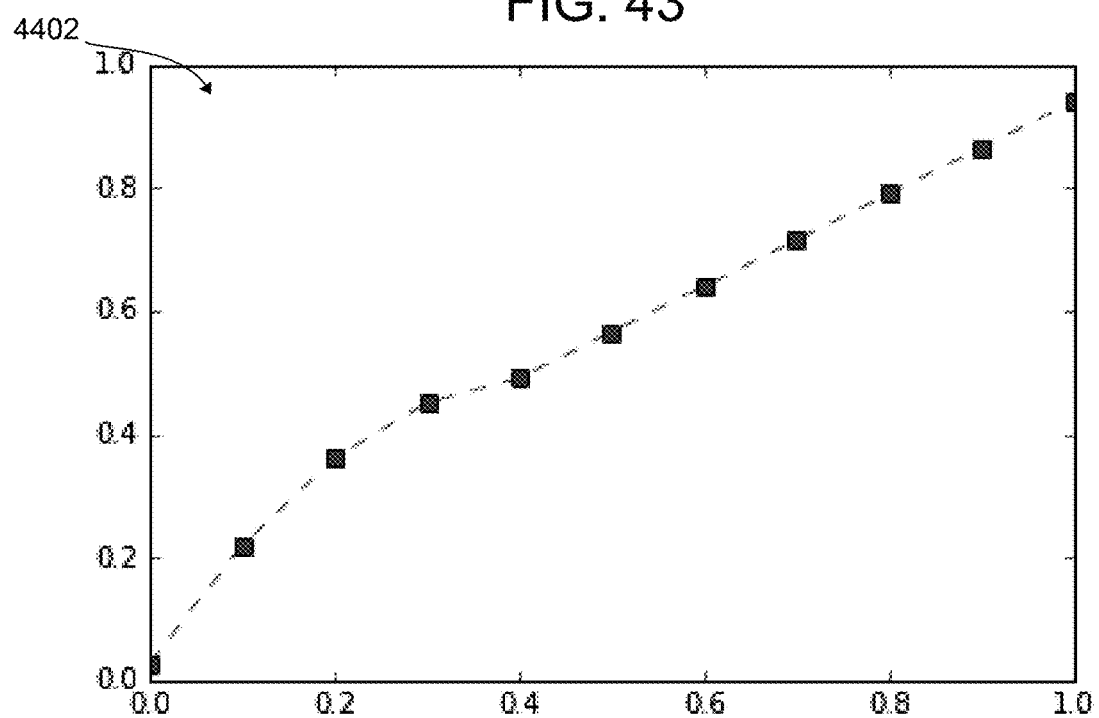
FIG. 44 is a transfer adjustment curve for generating the adjusted image of FIG. 45 and the adjusted histogram of FIG. 46.
Figure 45:
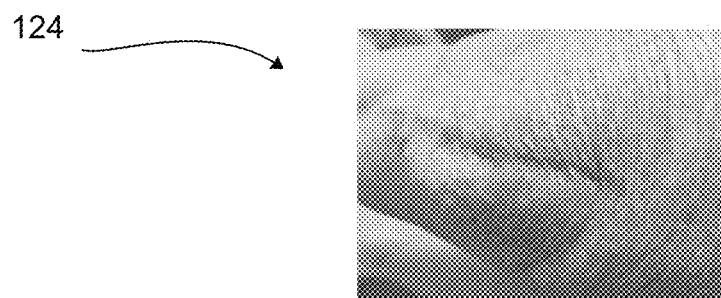
FIG. 45 is the adjusted image of FIG. 1.
Figure 46:
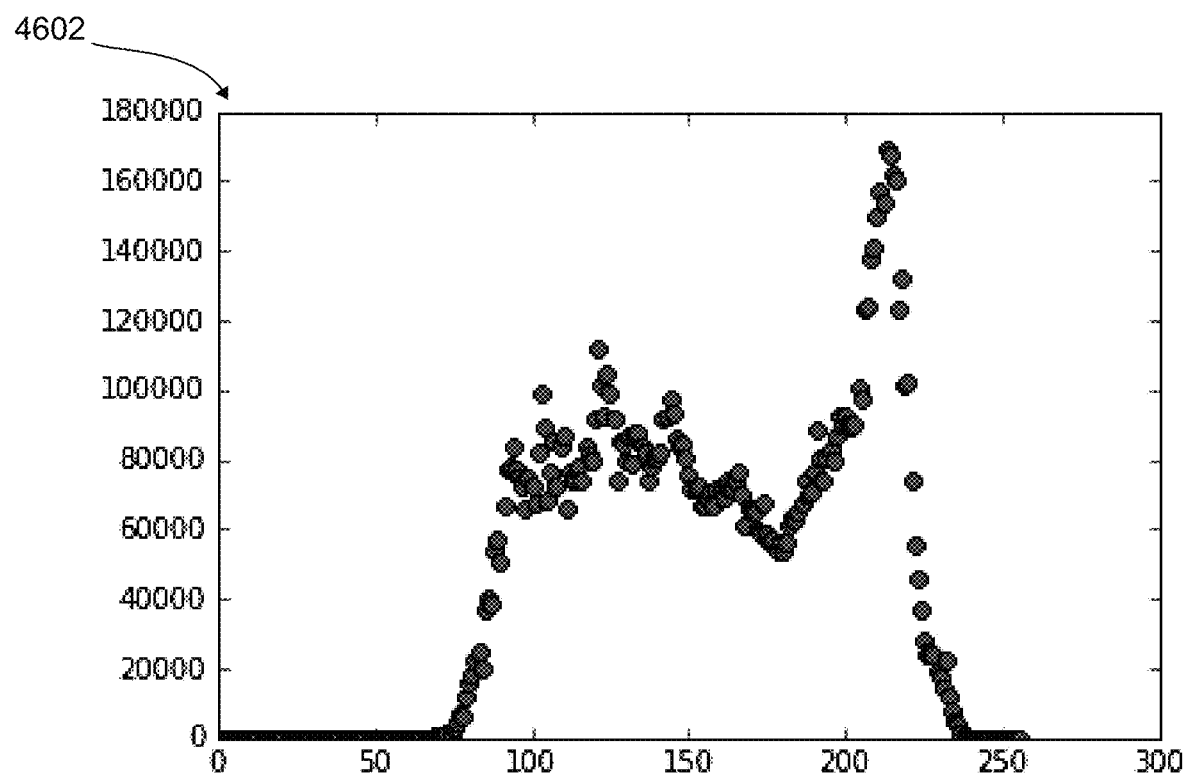
FIG. 46 is an adjusted image histogram of the adjusted image of FIG. 45.

Referring now to FIG. 44, therein is shown a transfer adjustment curve 4402 for generating the adjusted image 124 of FIG. 45 and the adjusted histogram 4602 of FIG. 46. The transfer adjustment curve 4402 can have the b parameter is set to 3 and the f parameter is set to 0.148. The transfer adjustment curve 4402 can be applied to each of the pixel values within the subsequent image histogram 3302 of FIG. 33 to produce the adjusted image 124 of FIG. 45 and the adjusted histogram 4602 of FIG. 46.

Referring now to FIG. 45, therein is shown the adjusted image of FIG. 1. The adjusted image 124 has been adjusted by, having the subsequent image histogram 3302 of FIG. 33 compressed with the transfer adjustment curve 4402 of FIG. 44. The adjusted image 124 can now successfully be color matched to the original image 116 of FIG. 1.

Referring now to FIG. 46, therein is shown an adjusted image histogram 4602 of the adjusted image 124 of FIG. 45. The pixel values are shown to be above the bottom third 4104 of FIG. 41 and below the 95% portion 4106 of FIG. 41. Furthermore, the pixel values within the top third 4102 of FIG. 41 have been compressed and lowered.

Figure 47:
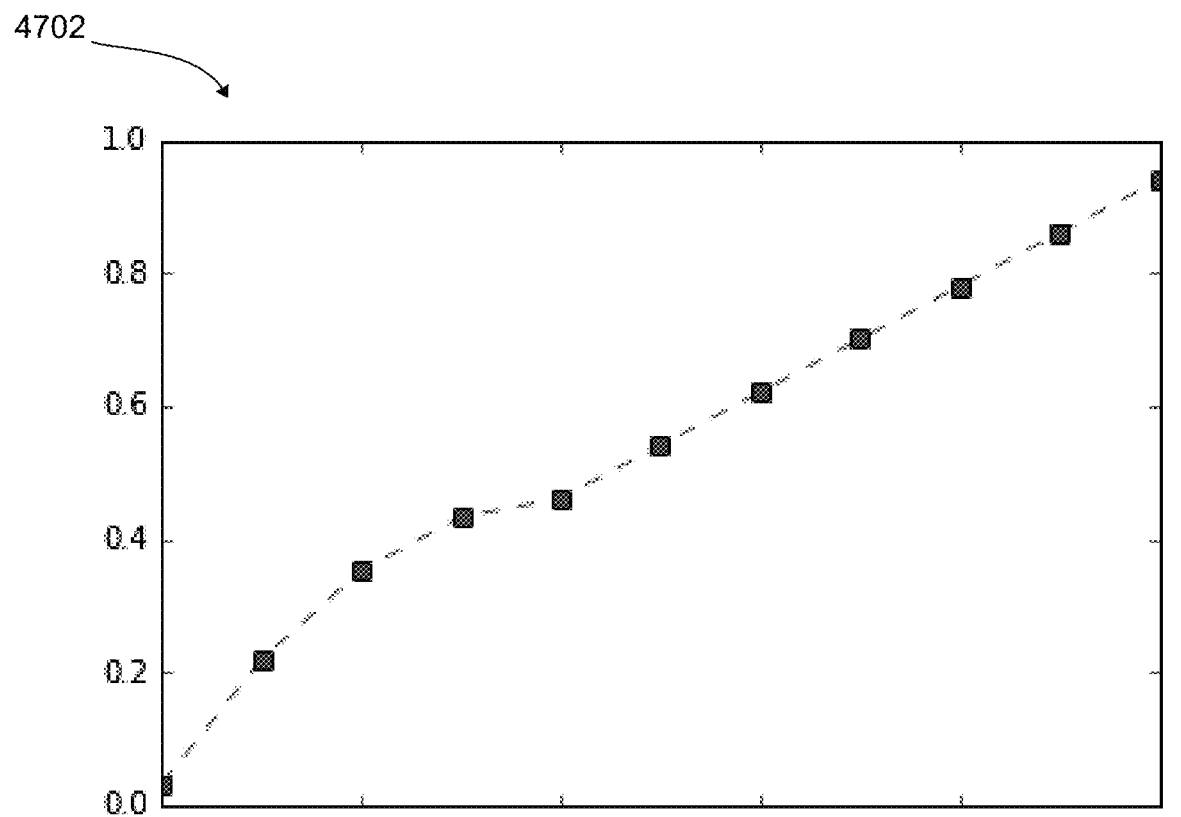
FIG. 47 is a transfer adjustment curve for generating the adjusted image of FIG. 48 and the adjusted histogram of FIG. 49.
Figure 48:
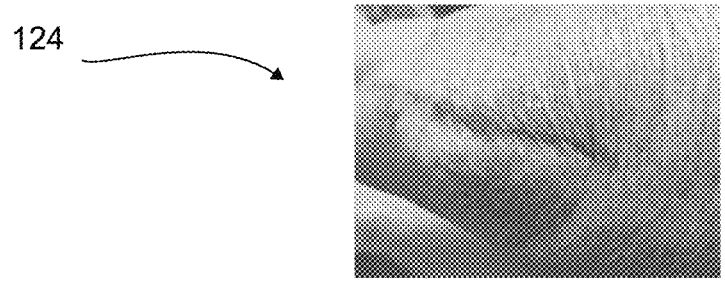
FIG. 48 is the adjusted image of FIG. 1.
Figure 49:
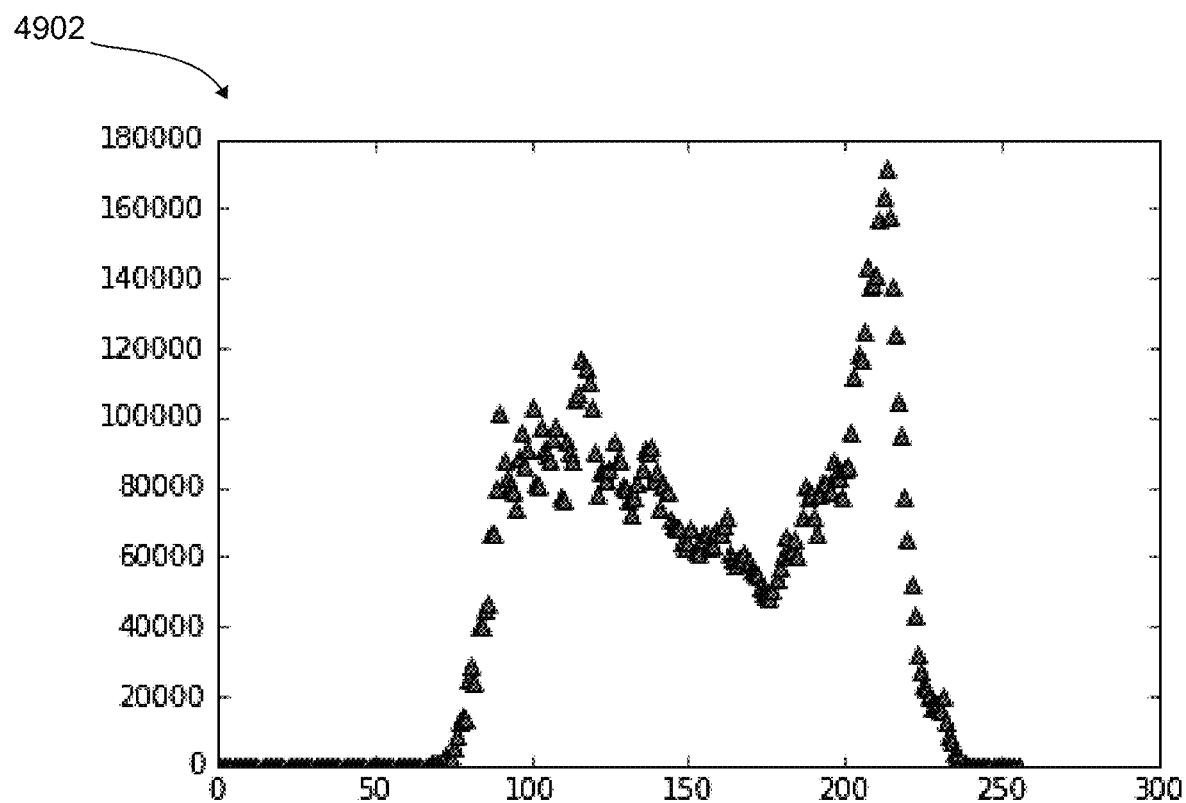
FIG. 49 is an adjusted image histogram of the adjusted image of FIG. 48.

Referring now to FIG. 47, therein is shown a transfer adjustment curve 4702 for generating the adjusted image 124 of FIG. 48 and the adjusted histogram 4902 of FIG. 49. The transfer adjustment curve 4702 can have the b parameter is set to 2.7 and the f parameter is set to 0.015. The transfer adjustment curve 4702 can be applied to each of the pixel values within the subsequent image histogram 3302 of FIG. 33 to produce the adjusted image 124 of FIG. 48 and the adjusted histogram 4902 of FIG. 49.

Referring now to FIG. 48, therein is shown the adjusted image 124 of FIG. 1. The adjusted image 124 has been adjusted by, having the subsequent image histogram 3302 of FIG. 33 compressed with the transfer adjustment curve 4702 of FIG. 47. The adjusted image 124 can now successfully be color matched to the original image 116 of FIG. 1.

Referring now to FIG. 49, therein is shown an adjusted image histogram 4902 of the adjusted image 124 of FIG. 48. The pixel values are shown to be above the bottom third 4104 of FIG. 41 and below the 95% portion 4106 of FIG. 41. Furthermore, the pixel values within the top third 4102 of FIG. 41 have been compressed and lowered.

Figure 50:
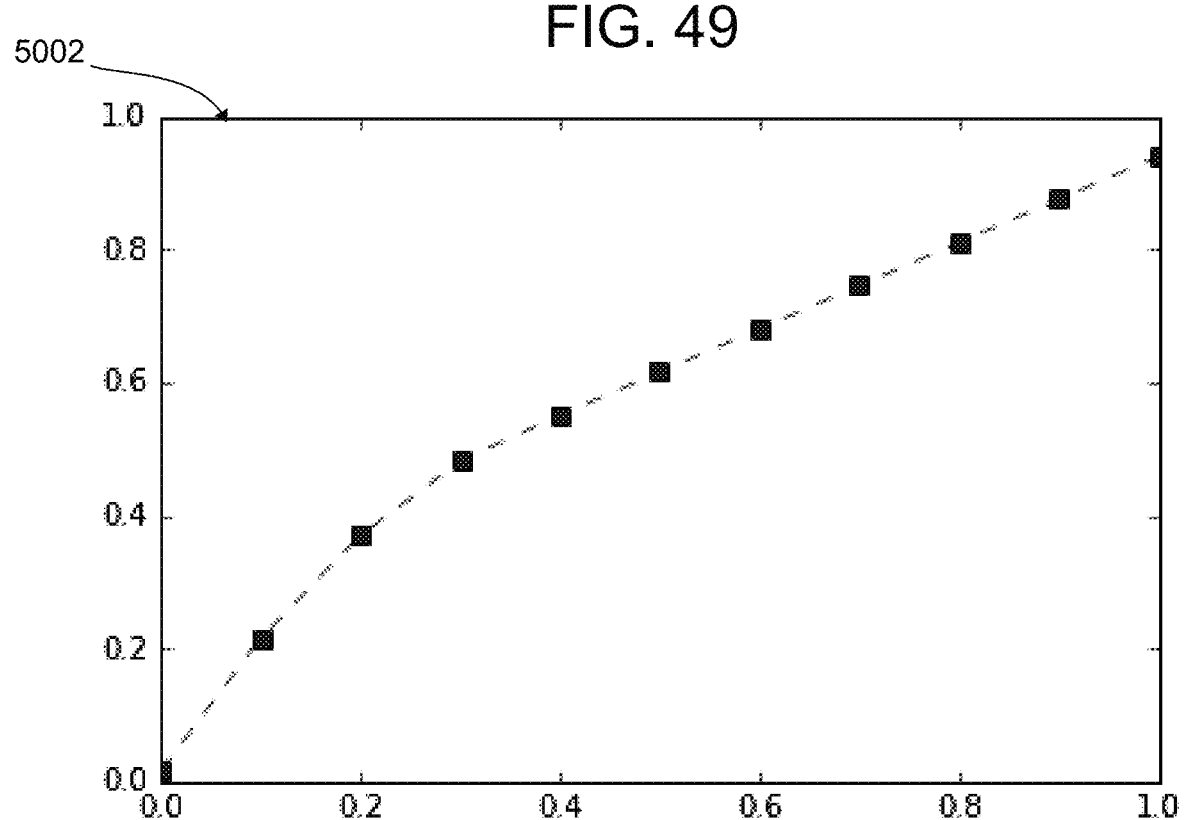
FIG. 50 is a transfer adjustment curve for generating the adjusted image of FIG. 51 and the adjusted histogram of FIG. 52.
Figure 51:
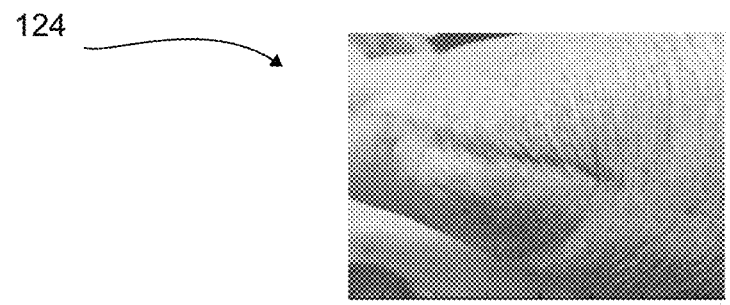
FIG. 51 is the adjusted image of FIG. 1.
Figure 52:
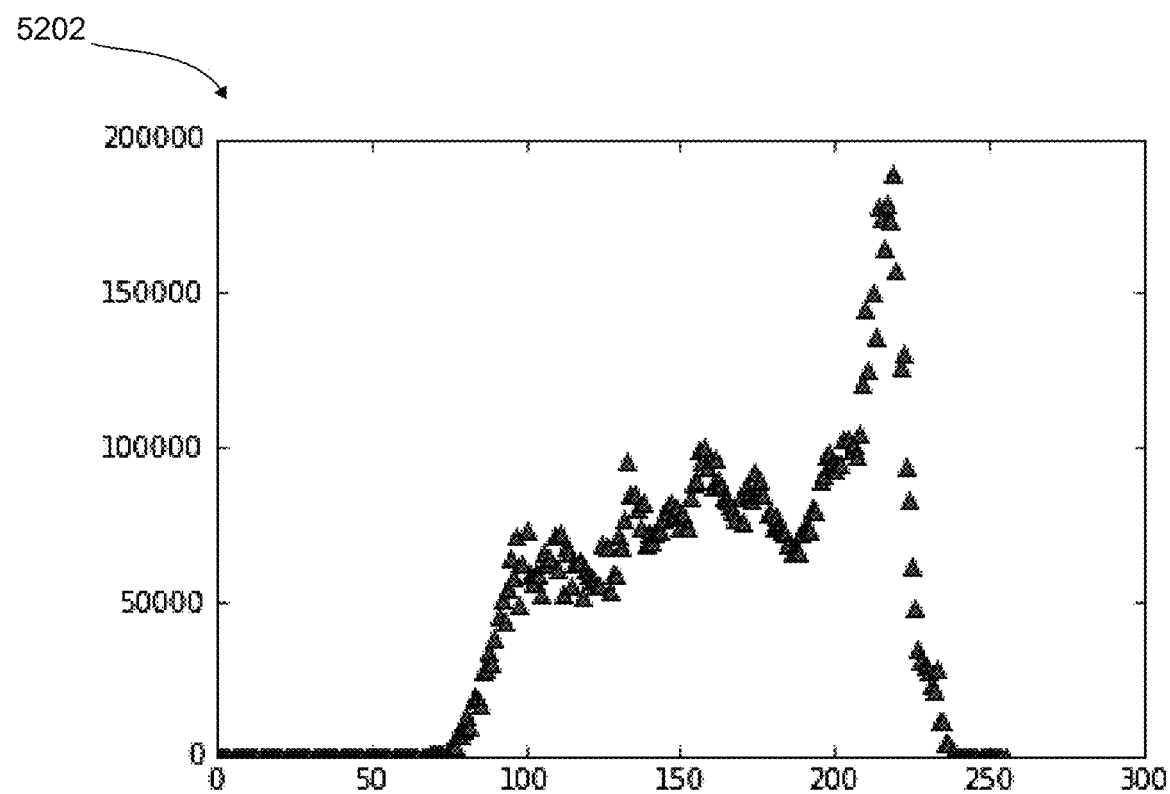
FIG. 52 is an adjusted image histogram of the adjusted image of FIG. 51.

Referring now to FIG. 50, therein is shown a transfer adjustment curve 5002 for generating the adjusted image 124 of FIG. 51 and the adjusted histogram 5202 of FIG. 52. The transfer adjustment curve 5002 can have the b parameter is set to 4.34 and the f parameter is set to 0.5. The transfer adjustment curve 5002 can be applied to each of the pixel values within the subsequent image histogram 3302 of FIG. 33 to produce the adjusted image 124 of FIG. 51 and the adjusted histogram 5202 of FIG. 52.

Referring now to FIG. 51, therein is shown the adjusted image 124 of FIG. 1. The adjusted image 124 has been adjusted by, having the subsequent image histogram 3302 of FIG. 33 compressed with the transfer adjustment curve 5002 of FIG. 50. The adjusted image 124 can now successfully be color matched to the original image 116 of FIG. 1.

Referring now to FIG. 52, therein is shown an adjusted image histogram 5202 of the adjusted image 124 of FIG. 51. The pixel values are shown to be above the bottom third 4104 of FIG. 41 and below the 95% portion 4106 of FIG. 41. Furthermore, the pixel values within the top third 4102 of FIG. 41 have been compressed and lowered.

Figure 53:
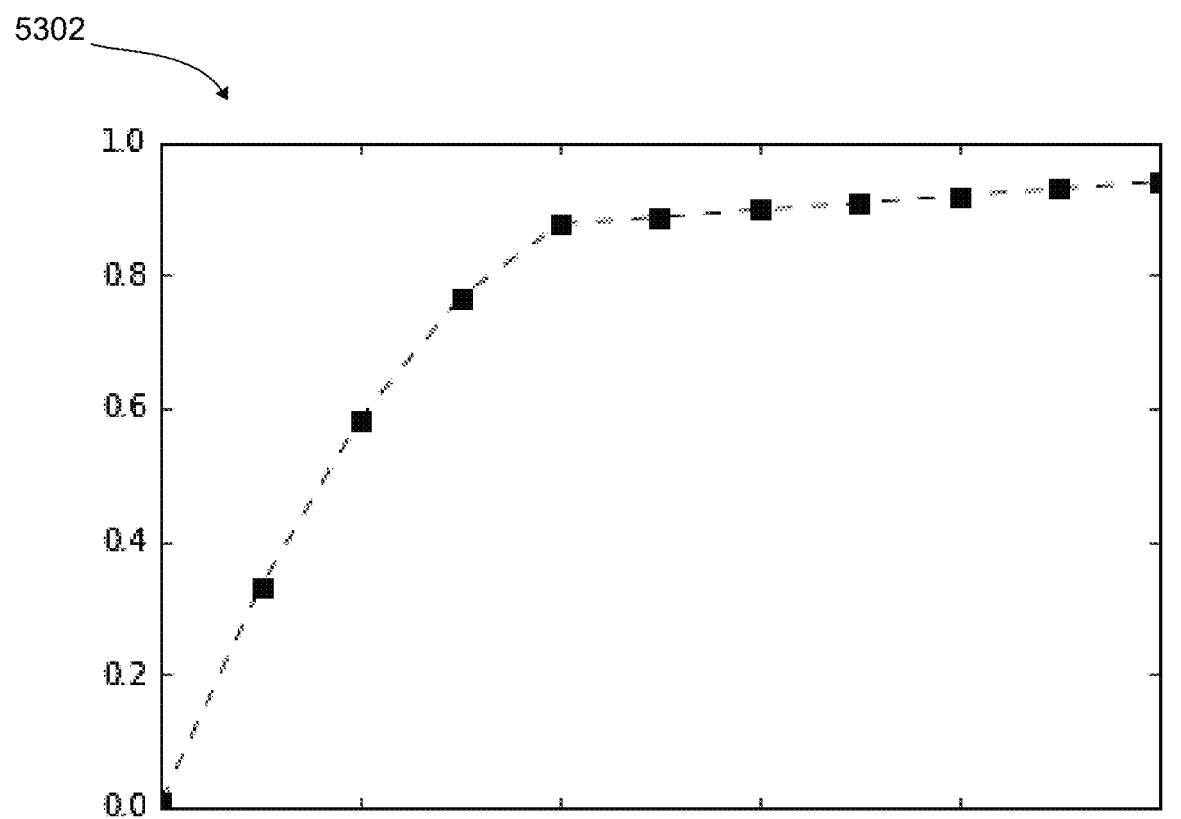
FIG. 53 is a transfer adjustment curve for generating the adjusted image of FIG. 54 and the adjusted histogram of FIG. 55.
Figure 54:
FIG. 54 is the adjusted image of FIG. 1.
Figure 55:
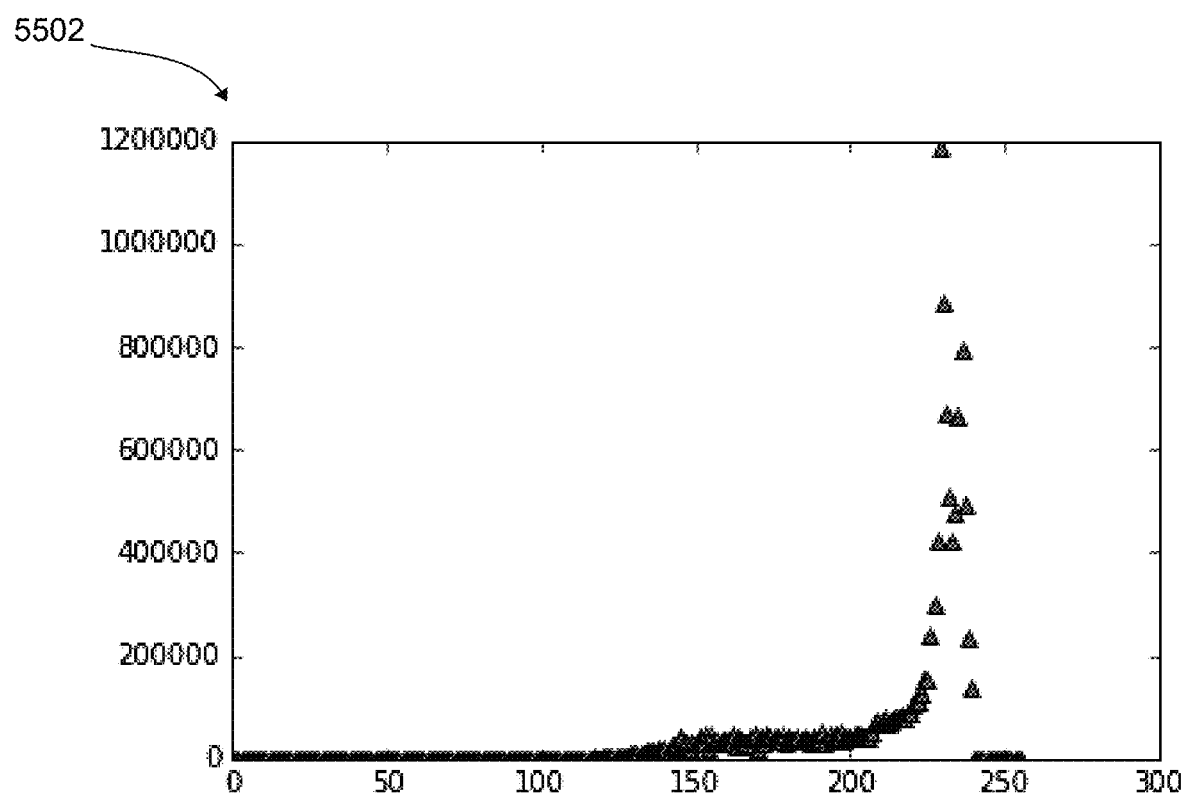
FIG. 55 is an adjusted image histogram of the adjusted image of FIG. 54.

Referring now to FIG. 53, therein is shown a transfer adjustment curve 5302 for generating the adjusted image 124 of FIG. 54 and the adjusted histogram 5502 of FIG. 55. The transfer adjustment curve 5302 can have the b parameter is set to 17.8 and the f parameter is set to 0.8. The transfer adjustment curve 5302 can be applied to each of the pixel values within the subsequent image histogram 3302 of FIG. 33 to produce the adjusted image 124 of FIG. 54 and the adjusted histogram 5502 of FIG. 55.

Referring now to FIG. 54, therein is shown the adjusted image 124 of FIG. 1. The adjusted image 124 has been adjusted by, having the subsequent image histogram 3302 of FIG. 33 compressed with the transfer adjustment curve 5302 of FIG. 53. The adjusted image 124 can now successfully be color matched to the original image 116 of FIG. 1.

Referring now to FIG. 55, therein is shown an adjusted image histogram 5502 of the adjusted image 124 of FIG. 54. The pixel values are shown to be above the bottom third 4104 of FIG. 41 and below the 95% portion 4106 of FIG. 41. Furthermore, the pixel values within the top third 4102 of FIG. 41 have been compressed and lowered.

Figure 56:
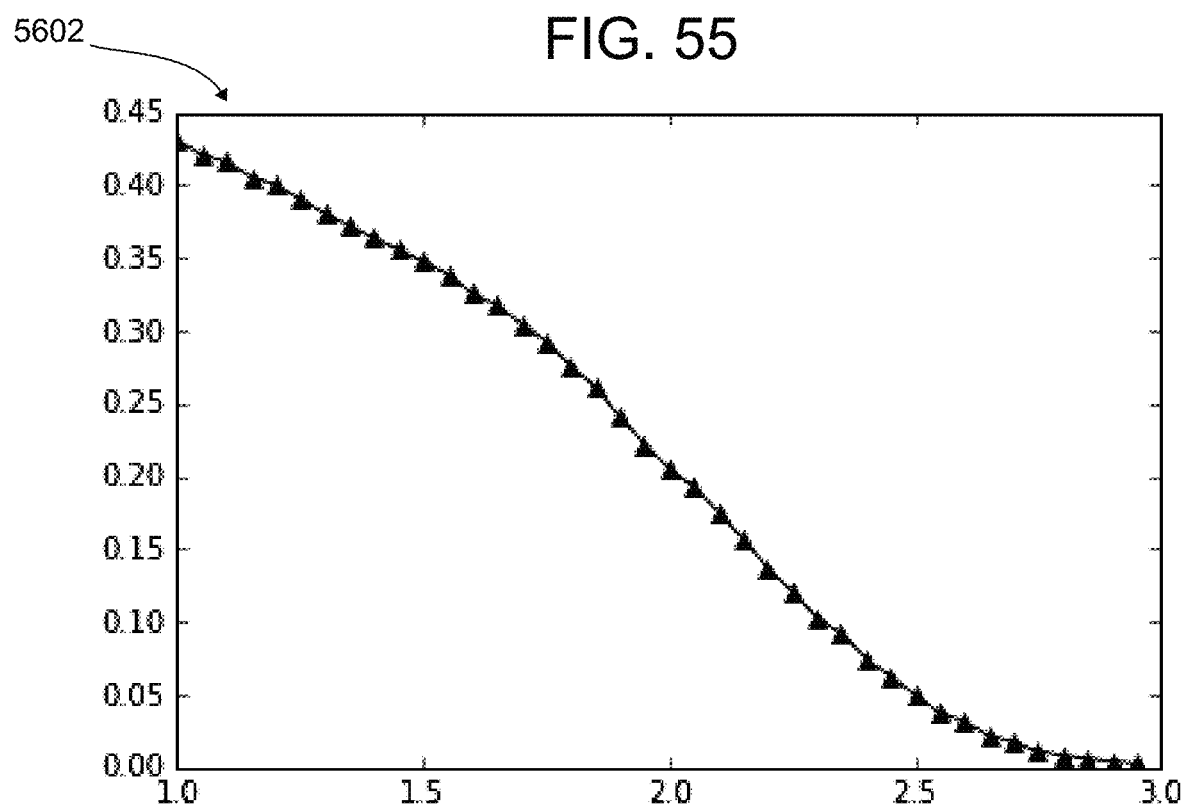
FIG. 56 is a plot for the function $\tau$ as a function of b, or $\tau(b)$.

Referring now to FIG. 56, therein is shown a plot 5602 for the function τ (along the y axis) as a function of b (along the x axis), or τ(b). As is illustrated, when a τ of 0.2 is selected, the b value corresponding to this τ value can be identified as 2.02.

Figure 57:
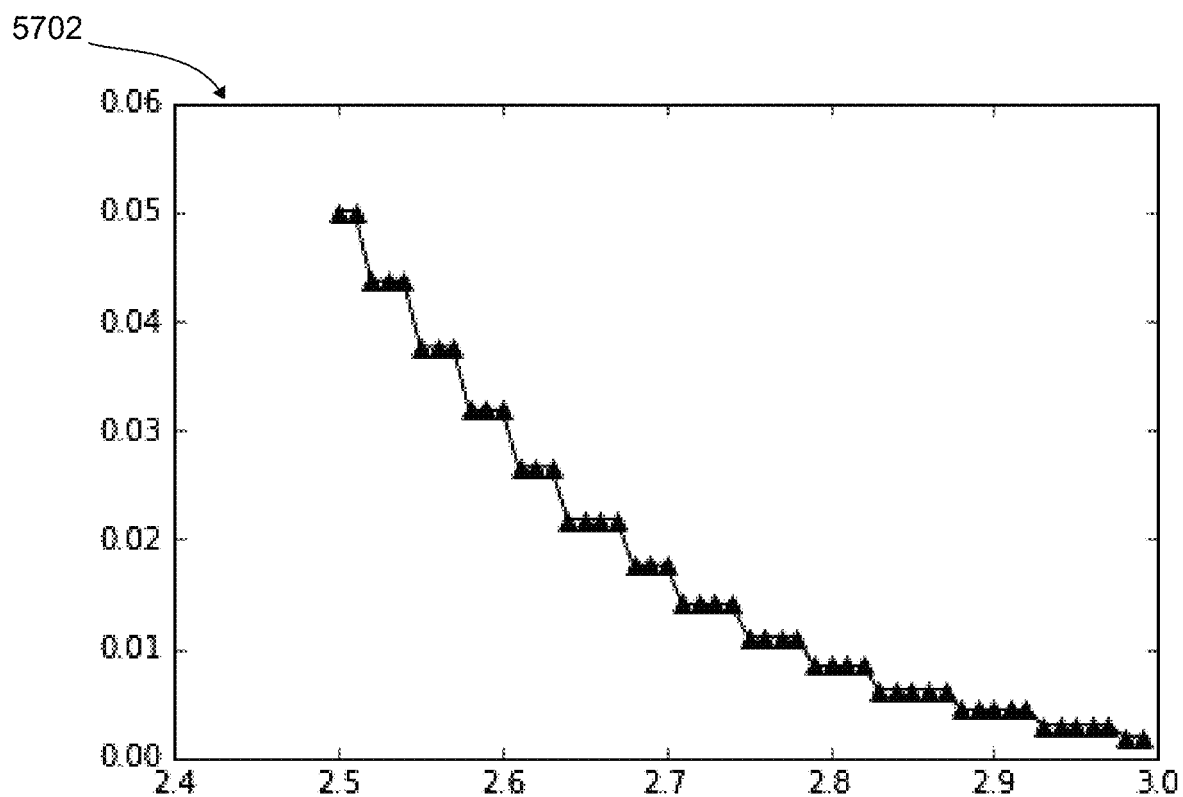
FIG. 57 is a plot for the function $\tau$ as a function of b, or $\tau(b)$ when the f parameter is fixed.

Referring now to FIG. 57, therein is shown a plot 5702 for the function τ (along the y axis) as a function of b (along the x axis), or τ(b) when the f parameter is fixed. For example, the f parameter can be set to 0.02 for the plot 5702. That is the plot 5702 is generated from a histogram which is a discrete function where the x-axis is represented as an integer from 0 to 255. Therefore, small changes in the transfer function (curve) will not change the numbers in the histogram bins; that is, the number of values in the lower 3rd of the histogram will not change.

As will be appreciated, the steps within the plot 5702 arise due to the plot 5702 being generated from a histogram which is a discrete function where the x-axis is represented as an integer from 0 to 255. Therefore small changes in the transfer function (curve) will not change the numbers in the histogram bins. For example, the number of values in the lower 3rd of the histogram will not change.

Typically, f is fixed between 0.2 and 0.5. Only b is adjusted to meet the τ specification. The parameter b can be implemented to increase the bump. The parameter g can be an offset from zero and is best kept as zero.

Figure 58:
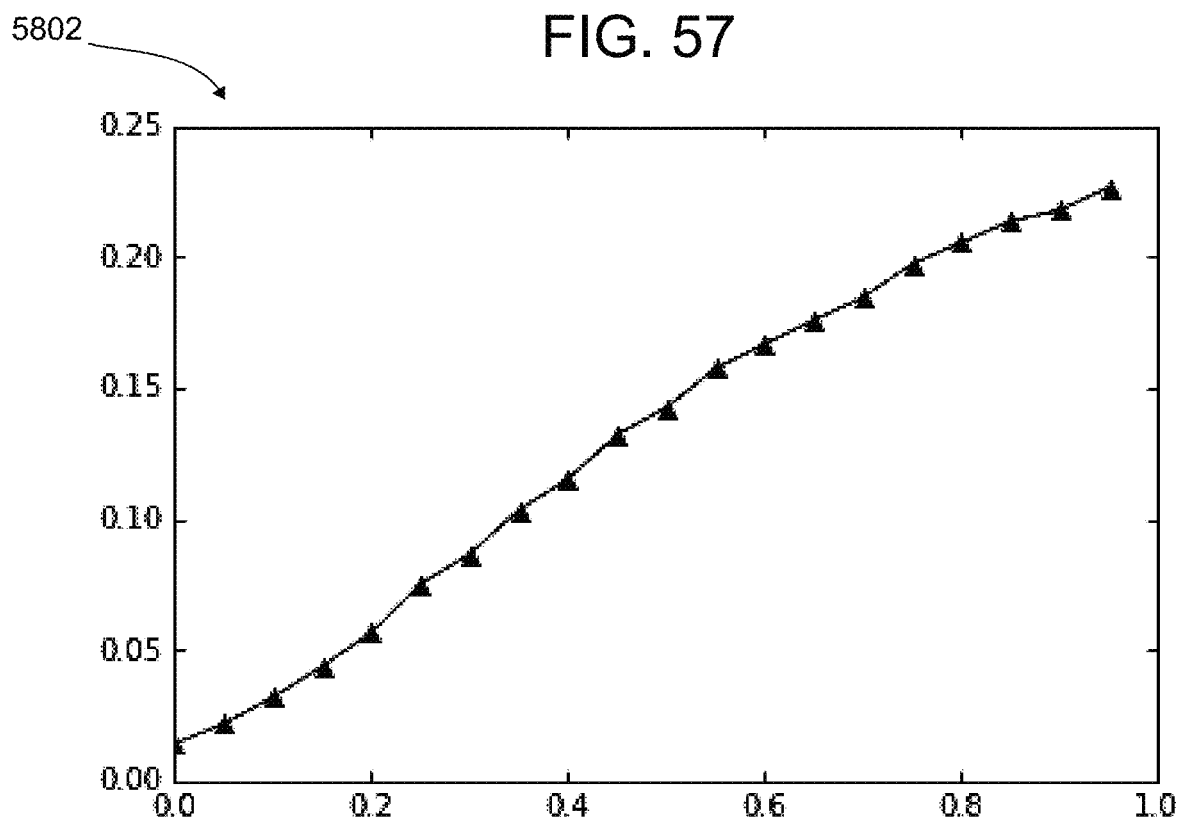
FIG. 58 is a plot for the function $\tau$ as a function of f, or $\tau(f)$.

Referring now to FIG. 58, therein is shown a plot 5802 for the function τ (along the y axis) as a function of f (along the x axis), or τ(f). As is illustrated, when a τ of 0.15 is selected, the f value corresponding to this τ value can be identified as 0.53.

Figure 59:
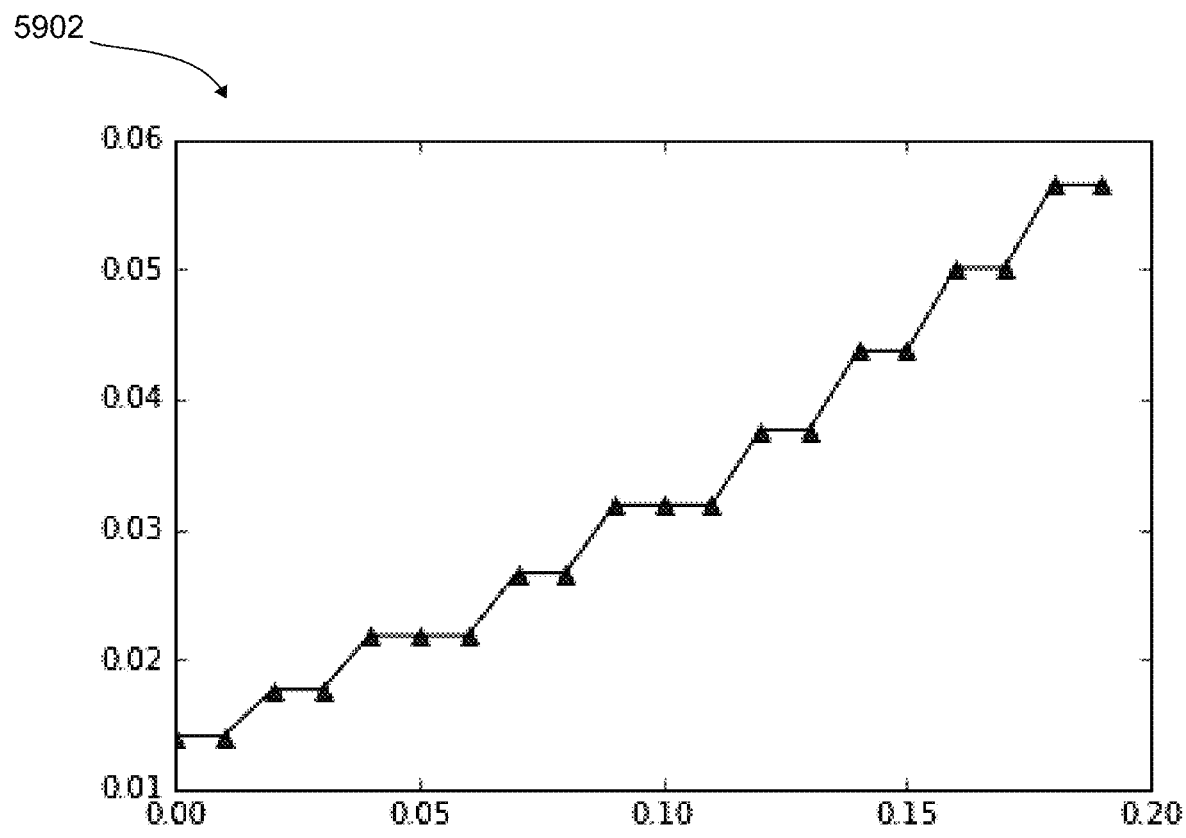
FIG. 59 is a plot for the function $\tau$ as a function of f, or $\tau(f)$ when the f parameter is fixed.

Referring now to FIG. 59, therein is shown a plot 5902 for the function τ (along the y axis) as a function of f (along the x axis), or τ(f) when the f parameter is fixed. For example, the f parameter can be set to 2.7 for the plot 5902. From either plot 5802 or plot 5902 a desired value of τ can be selected and then the corresponding value of f can be identified.

Figure 60:
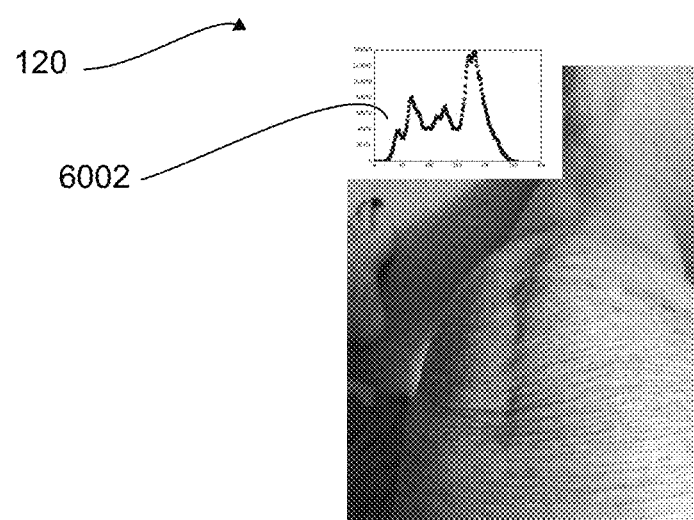
FIG. 60 is the subsequent image of FIG. 1.
Figure 61:
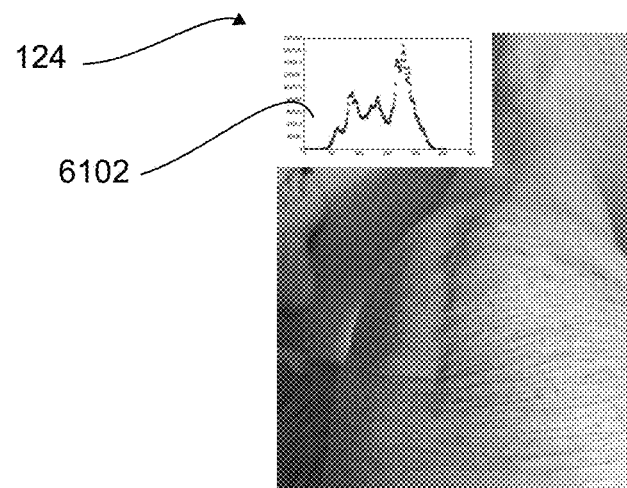
FIG. 61 is the adjusted image of FIG. 1 after a first adjustment.
Figure 62:
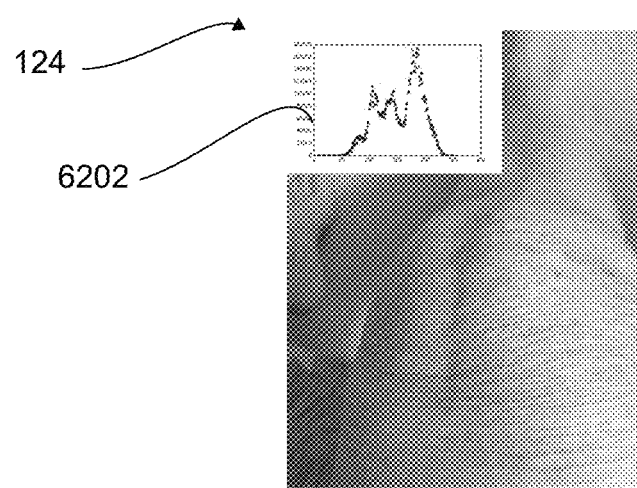
FIG. 62 is the adjusted image of FIG. 1 after a second adjustment.

Referring now to FIGS. 60-62, therein is shown a set of images including the subsequent image 120 of FIG. 60, the adjusted image 124 of FIGS. 61 and 62. As will be discussed below, FIG. 62 can be the adjusted image 124 as the good image 128 of FIG. 1 while the adjusted image 124 of FIG. 67 can be the problem image 126 of FIG. 1.

Referring now to FIG. 60, therein is shown the subsequent image 120 of FIG. 1. The subsequent image 120 can include a subsequent image histogram 6002 inset within the subsequent image 120 and include a τ of 0.22. It is contemplated that there could be issues with automatic adjustment. Specifically, there is a class or subset of images that may not be easily and automatically adjustable.

Illustratively, images with excessive shadowing on one part of the image and low contrast on the other, and images that are overall too dark, and images having dark regions in regions of no interest will result in the problem image 126 due to the fact that these errors are not readily correctable. These images will fail the underexposure threshold.

For instance, when the image is overall too dark, an adjustment will only add noise to the image. Further, when the image includes dark regions in regions of no interest will confuse the adjustment algorithm discussed above with regard to the image quality system 100 of FIG. 1.

Referring now to FIG. 61, therein is shown the adjusted image 124 of FIG. 1 after a first adjustment. The adjusted image 124 can include an adjusted image histogram 6102 inset within the adjusted image 124. The adjusted image 124 of FIG. 61 can be the good image 128 of FIG. 1 with the best balance of parameters set. Illustratively, for example τ can be set to 0.12 while f set to 0.5.

For example, the good image 128 can be shown to include good contrast on the right but is a little too dark on the left. However, as is illustrated by the adjusted image 124 of FIG. 62, further adjustment will lead to the problem image 126 of FIG. 62 due to the low contrast of the problem image 126.

Referring now to FIG. 62, therein is shown the adjusted image 124 of FIG. 1 after a second adjustment. The adjusted image 124 can include an adjusted image histogram 6202 inset within the adjusted image 124. The adjusted image 124 of FIG. 62 can be the problem image 126 of FIG. 1 with a suboptimal balance of parameters set. Illustratively, for example τ can be set to 0.06 while f set to 0.01. The problem image 126 can represent an over adjustment with the adjustment curve leading to overall low contrast for the problem image 126.

Figure 63:
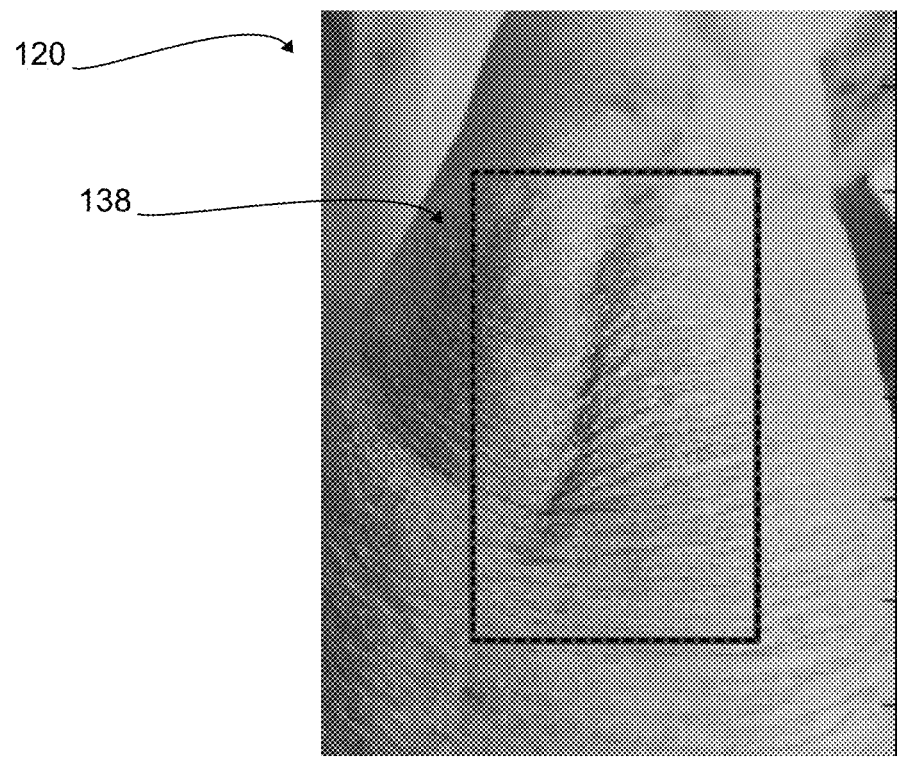
FIG. 63 is the subsequent image of FIG. 1 including the region of interest of FIG. 1.

Referring now to FIG. 63, therein is shown the subsequent image 120 of FIG. 1 including the region of interest 138 of FIG. 1. It has been discovered to be beneficial to define the region of interest 138 within the subsequent image 120 for many reasons.

One such reason is that defining the region of interest 138 enables an analysis of the region of interest 138 without reference or regard to the rest of the subsequent image 120, which may include many regions of non-interest. Further and more specifically, the region of interest 138 enables the image quality system 100 of FIG. 1 to test for focus and exposure only in the region of interest 138, which can be the only and most important region of the subsequent image 120.

Yet further, defining the region of interest 138 provides a reference and context within the subsequent image 120. For example, if the region of interest 138 were the only portion of the subsequent image 120 shown it would be difficult to determine what body part 134 of FIG. 1 is being shown; however, with the region of interest 138 seated in the context of the subsequent image 120, the body part 134 becomes readily identifiable as a knee.

Figure 64:
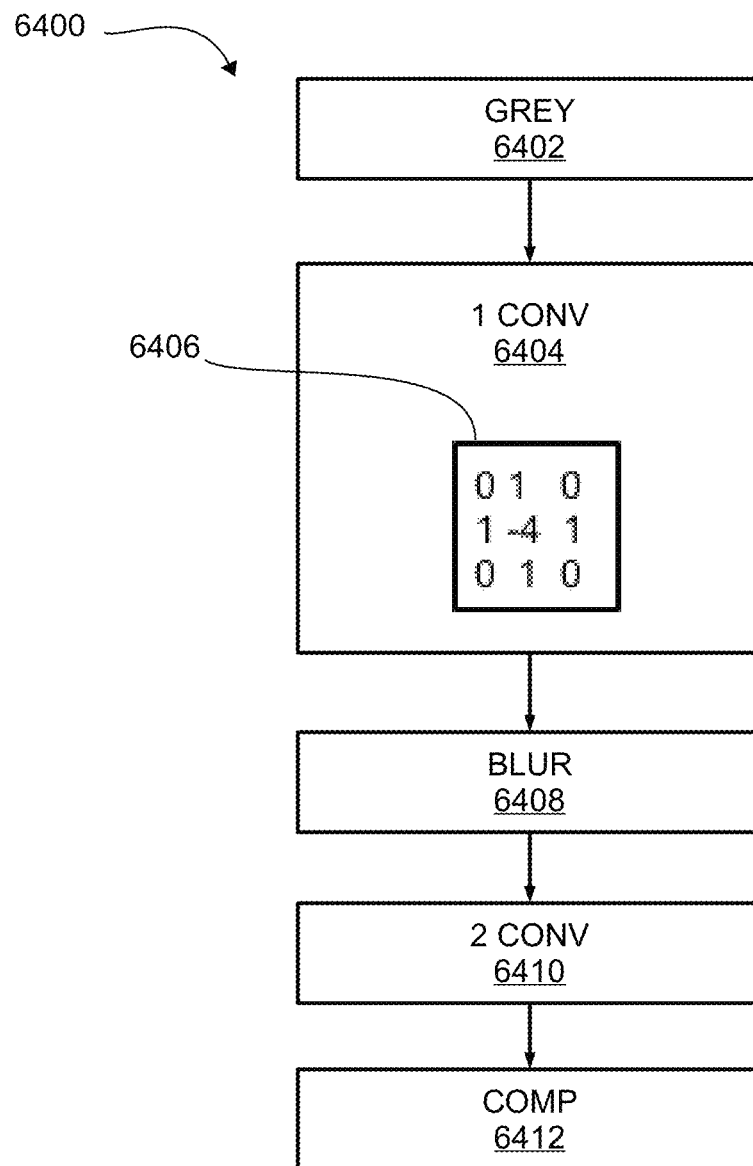
FIG. 64 is a control flow for the focus correction algorithm of the image quality system of FIG. 1.

Referring now to FIG. 64, therein is shown a control flow 6400 for the focus correction algorithm of the image quality system 100 of FIG. 1. The image quality system 100 can first initiate a convert to grey step 6402.

During the convert to grey step 6402, the subsequent image 120 can be defined as: "Img", and can be converted to a grey image defined as: "Imgr". Therefore, the convert to grey step 6402 can convert Img to Imgr, where Imgr is the adjusted image 124 in a grey phase of adjustment.

Once the convert to grey step 6402 has been executed, the image quality system 100 can execute a first convolve step 6404. During the first convolve step 6404, the Imgr can be convolved with a second derivative filter 6406, or in other words, can be governed by Equation 6:

$$Img2dr = Imgr \cdot \begin{vmatrix} 0 & 1 & 0 \\ 1 & -4 & 1 \\ 0 & 1 & 0 \end{vmatrix} \quad \text{Equation 6}$$

The image quality system 100 can next execute a blur step 6408. During the blur step 6408, the image quality system 100 can blur the Imgr, or the grey adjusted image 124 by convolution with an 11×11 Gaussian filter $G^{11 \times 11}$.

It is contemplated that the blur filter can be any size and any format. However, it has been discovered that a Gaussian filter provides the best results. The image quality system 100 can further execute a second convolve step 6410 in order to produce the second derivative of Equation 7. The blur step 6408 and the second convolve step 6410 can be governed by Equation 7:

$$Img2drB = (Imgr \cdot G^{11 \times 11}) \cdot \begin{bmatrix} 0 & 1 & 0 \\ 1 & -4 & 1 \\ 0 & 1 & 0 \end{bmatrix} \qquad \text{Equation 7}$$

The second derivative (Img2dr) of the original gray image resulting from the first convolve step 6404 can be compared to the second derivative (Img2drB) of the second convolve step 6410 during a compare step 6412. The second derivatives Img2dr and Img2drB can be 2D grayscale images with (m×n) matrices.

In order to obtain a single metric, the compare step 6412 can use either variance or standard deviation of the images. Illustratively, the compare step 6412 can obtain V0 and V1. V0 can be computed using Equation 8:

$$V0 = \text{var}(Img2dr) \qquad \text{Equation 8}$$

V1 can be computed using Equation 9:

$$V1 = \text{var}(Img2drB) \qquad \text{Equation 9}$$

It has been discovered that if the subsequent image 120 is well focused then V0 will be in the range of 30 to 1000. The value depends on the number of pixels and the complexity of the image. If the image is in focus with a "high" V0 then the blur of the image will have a V1 of less than 10. Also, the ratio of V0/V1 should be greater than 10 for a well focused image. If the ratio is 3 or lower, then the image is significantly out of focus.

Thus, it has been discovered that the image quality system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the image quality system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

As will be appreciated, the methods and systems of obtaining an original image; sensing a subsequent image with an image-capturing device, comprising: testing a focus of the subsequent image with the image-capturing device implementing a blur test, informing a user to retake the subsequent image based on the subsequent image failing the blur test, evaluating a histogram for the subsequent image, informing the user to retake the subsequent image based on the histogram including a value exceeding a saturation threshold, and informing the user to retake the subsequent image based on the histogram including the value exceeding an underexposure threshold; compressing the exposure histogram with an adjustment curve; and color matching the subsequent image to the original image enable the image quality system 100 to perform the function of image correction using methods, techniques, and procedures not used by human users, and which computers were previously unable to perform.

Further it is contemplated that the methods and systems of obtaining an original image; sensing a subsequent image with an image-capturing device, comprising: testing a focus of the subsequent image with the image-capturing device implementing a blur test, informing a user to retake the subsequent image based on the subsequent image failing the blur test, evaluating a histogram for the subsequent image, informing the user to retake the subsequent image based on the histogram including a value exceeding a saturation threshold, and informing the user to retake the subsequent image based on the histogram including the value exceeding an underexposure threshold; compressing the exposure histogram with an adjustment curve; and color matching the subsequent image to the original image are directed to improvements in computer functionality by decreasing the total amount of data storage requirements and data communication requirements because the uncorrectable problem images are not stored on the image quality system 100 but are immediately discarded and the user is informed to retake the image.

The improvements to computer functionality are especially important when dealing with mobile systems. This is because mobile systems can utilize metered data, have limited processing power, have limited storage capacity, among other well known limitations.

It is therefore contemplated that the methods and systems of obtaining an original image; sensing a subsequent image with an image-capturing device, comprising: testing a focus of the subsequent image with the image-capturing device implementing a blur test, informing a user to retake the subsequent image based on the subsequent image failing the blur test, evaluating a histogram for the subsequent image, informing the user to retake the subsequent image based on the histogram including a value exceeding a saturation threshold, and informing the user to retake the subsequent image based on the histogram including the value exceeding an underexposure threshold; compressing the exposure histogram with an adjustment curve; and color matching the subsequent image to the original image enables computers, such as mobile platforms, to operate with increased functionality and even new functionality. That is, these methods and systems can allow computer systems to provide a consistent exposure, saturation, focus, and color for images and image analysis.

What is claimed is:

1. A method of operating an image quality system comprising:
   obtaining an original image;
   sensing a subsequent image with an image-capturing device, comprising:
      evaluating a histogram for the subsequent image,
      informing a user to retake the subsequent image based on the histogram including a value exceeding a saturation threshold, and
      informing the user to retake the subsequent image based on the histogram including the value exceeding an underexposure threshold;
   compressing the histogram with an adjustment curve; and
   color matching the subsequent image to the original image.

2. The method of claim 1 further comprising testing a focus of the subsequent image including:
   calculating a first variance of intensity for the subsequent image;

calculating a second variance of intensity for the subsequent image after a gaussian blur has been applied to the subsequent image; and comparing a difference between the first variance of intensity and the second variance of intensity to a variance threshold.

3. The method of claim 1 wherein informing the user based on the subsequent image having the value exceeding the saturation threshold includes informing the user to retake the subsequent image based on the subsequent image having a pixel detected within the histogram with an RGB value of 255.

4. The method of claim 1 wherein informing the user based on the subsequent image having the value exceeding the underexposure threshold includes informing the user to retake the subsequent image based on the subsequent image having a pixel detected within the histogram with an RGB value of below 25.

5. The method of claim 1 wherein compressing the histogram of the subsequent image includes:

raising first pixel values within a lower third of the histogram for decreasing a first number of pixels within the lower third of the histogram;

lowering second pixel values within an upper third of the histogram for decreasing a second number of pixels within the upper third of the histogram; or a combination thereof.

6. The method of claim 1 wherein compressing the histogram includes compressing pixel values within the histogram according to the following equation:

$$y_1 = -bx^2 + 2bx_L x + g$$

based on x being less than or equal to $x_L$, and where:
b sets forth a bump parameter;
g sets forth an offset from zero; and
$x_L$ sets forth a transition point from quadratic to line.

7. The method of claim 6 wherein compressing the histogram includes compressing the pixel values within the histogram according to the following equation:

$$y_2 = \omega(x-1) + a$$

based on x being greater than $x_L$.

8. A non-transitory computer readable medium in useful association with a processor having instructions configured to:

obtain an original image;
sense a subsequent image with an image-capturing device including instructions configured to:
evaluate a histogram for the subsequent image,
inform a user to retake the subsequent image based on the histogram including a value exceeding a saturation threshold, and
inform the user to retake the subsequent image based on the histogram including the value exceeding an underexposure threshold;
compress the histogram with an adjustment curve; and
color match the subsequent image to the original image.

9. The computer readable medium of claim 8 further comprising instructions configured to test a focus including instructions configured to:
calculate a first variance of intensity for the subsequent image;
calculate a second variance of intensity for the subsequent image after a gaussian blur has been applied to the subsequent image; and compare a difference between the first variance of intensity and the second variance of intensity to a variance threshold.

10. The computer readable medium of claim 8 wherein the instructions configured to inform the user based on the subsequent image having the value exceeding the saturation threshold includes instructions configured to inform the user to retake the subsequent image based on the subsequent image having a pixel detected within the histogram with an RGB value of 255.

11. The computer readable medium of claim 8 wherein the instructions configured to inform the user based on the subsequent image having the value exceeding the underexposure threshold includes instructions configured to inform the user to retake the subsequent image based on the subsequent image having a pixel detected within the histogram with an RGB value of below 25.

12. The computer readable medium of claim 8 wherein the instructions configured to compress the histogram of the subsequent image includes instructions configured to:

raise first pixel values within a lower third of the histogram for decreasing a first number of pixels within the lower third of the histogram;

lower second pixel values within an upper third of the histogram for decreasing a second number of pixels within the upper third of the histogram; or a combination thereof.

13. The computer readable medium of claim 8 wherein the instructions configured to compress the histogram includes instructions configured to compress pixel values within the histogram according to the following equation:

$$y_1 = -bx^2 + 2bx_L x + g$$

based on x being less than or equal to $x_L$, and where:
b sets forth a bump parameter;
g sets forth an offset from zero; and
$x_L$ sets forth a transition point from quadratic to line.

14. The computer readable medium of claim 13 wherein the instructions configured to compress the histogram includes instructions configured to compress the pixel values within the histogram according to the following equation:

$$y_2 = \omega(x-1) + a$$

based on x being greater than $x_L$.

15. An image quality system comprising:
an image-capturing device configured to sense a subsequent image, the image-capturing device configured to:
evaluate a histogram for the subsequent image,
inform a user to retake the subsequent image based on the histogram including a value exceeding a saturation threshold, and
inform the user to retake the subsequent image based on the histogram including the value exceeding an underexposure threshold; and
a processor configured to:
obtain an original image,
compress the histogram with an adjustment curve, and
color match the subsequent image to the original image.

16. The system of claim 15 wherein the image-capturing device configured to test a focus and configured to:
calculate a first variance of intensity for the subsequent image;
calculate a second variance of intensity for the subsequent image after a gaussian blur has been applied to the subsequent image; and compare a difference between the first variance of intensity and the second variance of intensity to a variance threshold.

17. The system of claim 15 wherein the image-capturing device configured to inform the user based on the subsequent image having the value exceeding the saturation threshold is further configured to inform the user to retake the subsequent image based on the subsequent image having a pixel detected within the histogram with an RGB value of 255.

18. The system of claim 15 wherein the image-capturing device configured to inform the user based on the subsequent image having the value exceeding the underexposure threshold is further configured to inform the user to retake the subsequent image based on the subsequent image having a pixel detected within the histogram with an RGB value of below 25.

19. The system of claim 15 wherein the processor configured to compress the histogram of the subsequent image is further configured to:

raise first pixel values within a lower third of the histogram for decreasing a first number of pixels within the lower third of the histogram;

lower second pixel values within an upper third of the histogram for decreasing a second number of pixels within the upper third of the histogram; or a combination thereof.

20. The system of claim 15 wherein the processor configured to compress the histogram is further configured to compress pixel values within the histogram according to the following equation:

$$y_1 = -bx^2 + 2bx_L x + g$$

based on x being less than or equal to $x_L$, and where:
b sets forth a bump parameter;
g sets forth an offset from zero; and
$x_L$ sets forth a transition point from quadratic to line.

* * * * *